US005136621A

United States Patent [19]

Mitchell et al.

[11] Patent Number: 5,136,621

[45] Date of Patent: Aug. 4, 1992

[54] TIMING AND LAP COUNTING DEVICE FOR A SWIMMER

[76] Inventors: Mitchell, David E., Box 131C, R.R. 2, Poseyville, Ind. 47633; Dean Lurker, 909 Towne Lake Dr., Longview, Tex. 75601

[21] Appl. No.: 625,902

[22] Filed: Dec. 11, 1990

[51] Int. Cl.[5] .................... G01C 22/00; G04B 19/00; H01H 36/00

[52] U.S. Cl. .................... 377/24.2; 377/5; 377/112; 324/179; 434/254; 272/71; 368/1; 368/89; 340/565; 482/8; 482/55

[58] Field of Search .................... 377/24.1, 24.2, 38, 377/5.6; 324/178, 179; 434/254; 272/71; 368/89, 1, 5; 340/565

[56] References Cited

U.S. PATENT DOCUMENTS

| | | | |
|---|---|---|---|
| 3,696,610 | 10/1972 | Charbonnier | 368/1 |
| 3,781,529 | 12/1973 | Abramson et al. | 324/178 |
| 3,934,123 | 1/1976 | Maurer et al. | 377/38 |
| 4,017,794 | 4/1977 | Romrell | 324/178 |
| 4,180,726 | 12/1979 | De Crescent | 324/178 |
| 4,356,387 | 10/1982 | Tsubota et al. | 377/6 |
| 4,392,122 | 7/1983 | Hocken | 324/179 |
| 4,518,266 | 6/1985 | Dawley | 368/10 |
| 4,681,118 | 7/1987 | Asai et al. | 128/643 |
| 4,697,278 | 9/1987 | Fleischer | 377/24.1 |
| 4,700,369 | 10/1987 | Siegal et al. | 377/24.1 |
| 4,780,085 | 10/1988 | Malone | 434/254 |
| 4,823,367 | 4/1989 | Kreutzfeld | 377/24.2 |
| 4,857,866 | 8/1989 | Crews | 340/323 R |
| 4,932,045 | 6/1990 | Kasoff et al. | 377/24.2 |
| 4,989,272 | 1/1991 | Lutts et al. | 377/24.1 |

*Primary Examiner*—John S. Heyman
*Attorney, Agent, or Firm*—Baker & Daniels

[57] ABSTRACT

Swim/sporting event timer/counter. A waterproof housing has upwardly projecting digital displays and two spaced ultrasonic receivers. A swimmer wears an ultrasonic transmitter tuned to ultrasonic receivers. by measuring the time differential for the ultrasonic signals from the transmitter to reach the receivers in the housing, the position of the swimmer (i.e., in front of, directly over, or behind the housing), is determined. Laps are identified by determining when the transmitted signal changes from being received by the two receivers by an increasing time differential to being received by a decreasing time differential. Each time the swimmer passes over the housing, the numbers on the display are inverted so that the swimmer may look down into the water and see the time regardless of which direction the swimmer is traveling in the lane or other predetermined course.

37 Claims, 12 Drawing Sheets

TIMING AND LAP COUNTING DEVICE FOR A SWIMMER

FIELD OF THE INVENTION

The present invention relates to sporting event lap counters/timers and, in particular, to sporting event lap counters/timers used by swimmers.

BACKGROUND OF THE INVENTION

It is important for competitive swimmers or other persons travelling laps on predetermined courses to know the time it takes to complete each lap, as well as other statistics such as the total elapsed time, lap number and temperature. Several devices are known in the art for providing some of these statistics.

Two of the most common devices used by swimmers are (1) water-resistant wrist-watches that are self-activated and (2) large electrical clocks that are above the water and are visible to swimmers. The clocks are more generally used in recreational lap swimming and are usually located at the end of a swimming lane. They require a swimmer to raise the swimmer's head above the water level to view the last split time swam by the swimmer, and the time depicted is an approximate time because the clock does not reset at the end of each lap swam. The wrist-watches are not workable for swimmers except for monitoring total elasped time, because a swimmer must activate the watch after each lap to monitor split times, thereby interrupting swimming activity. As a result, it is very difficult to conveniently view progress during the swim.

One prior lap timer, disclosed in Dawley, U.S. Pat. No. 4,518,266 shows a lap timer having a kick pad which is submerged in water, and readouts that are positioned above the water level. Each time a swimmer completes a lap, the swimmer makes active contact with the kick pad and a lap time is computed. This device has the deficiencies of (a) requiring the swimmer to specifically attempt to touch the kick pad during each lap, and (b) requiring the swimmer to lift the swimmer's head out of the water to view the readouts. As a result, it is very difficult for the swimmer to view progress during the swim.

Other electronic devices for use by swimmers and divers are known. For example, Charbonnier, U.S. Pat. No. 3,696,610 discloses an underwater wristwatch containing a timer to indicate the duration of a compression stage to be observed by a diver. However, this patent does not disclose a device for determining elasped time or the number of laps traversed by a swimmer, nor does it include any digital displays. Siegal, U.S. Pat. No. 4,700,369 and Kasoff, U.S. Pat. No. 4,932,045 also disclose swim lap counters in which the completion of a lap is indicated by a physical switch. The Siegal device, like Dawley, requires that a switch be manually depressed by a swimmer upon completion of each lap. Both of these devices have the shortcoming of requiring the swimmer to consciously locate and depress the switch upon completion of each lap. Kasoff discloses a lap counter that may be worn in the palm of a hand or the bottom of a foot as shown in its FIGS. 4 and 5, and is actuated by the swimmer striking the device against the side of pool. Although Kasoff does not require that the swimmer contact any particular portion of the pool upon completion of a lap, the swimmer must still consciously contact the side of the pool with sufficient force to actuate the mechanical switch. The Siegal and Kasoff devices include underwater digital displays of lap counts, while the Dawley device includes displays for additional information including split time and elapsed time. However, none of these devices is configured so it may be placed on the bottom of a pool.

Malone, U.S. Pat. No. 4,780,085 discloses a lap timing device that does not detect completion of a lap by a mechanical switch, but rather by an ultrasonic proximity detector positioned at the end of a swimming lane. An ultrasonic wave is normally absorbed by water indicating a swimmer is not positioned in proixmity to the timer. However, when the swimmer approaches the counter, ultrasonic waves are reflected back toward the counter to generate a lap completion signal. The device also displays a variety of statistics regarding a training session, including total swim time, average lap time, and minimum and maximum lap times. However, the readouts of the Malone device are not observable by a swimmer looking toward the bottom of a pool, nor they observable by a swimmer regardless of the direction in the pool lane the swimmer is swimming. Moreover, the proximity detection system does not provide sufficiently accurate results.

Crews, U.S. Pat. No. 4,857,886 discloses a networked racing vehicle timing/location system in which multiple transceivers are positioned at various stages along a race course and also on each race vehicle. Each stationary transceiver transmits a narrow width signal. When the transceiver on a vehicle detects a narrow width signal from a stationary transceiver, the vehicle transceiver transmits a coded signal to the stationary transceiver which identifies the particular vehicle. A remote computer is connected to all stationary transceivers in order to continuously monitor the location of all vehicles. However, in this system, the vehicles must have receivers, and times are not computed by comparing the time it takes for a single transmitted signal to reach two spaced receivers.

Asai, U.S. Pat. No. 4,681,118, discloses a system in which a swimmer may wear a heart monitoring device that transmits signals to generate an electrocardiogram of the swimmer. However, this system does not generate total or split lap times, and multiple swimmers in the same pool using such devices would generate interfering signals.

Finally, none of the above-reference patents discloses a swimming lap counter/timer that includes a means for storing data regarding swimming sessions and transferring the data to a computer for subsequent analysis.

One object of the invention is to provide a swimmer timer that is waterproof and fully submersible, and which includes an upwardly projecting display so that it may be viewed by a swimmer without the swimmer raising the swimmer's head out of the water.

Another object of the invention is to provide a swimmer timer that does not require a swimmer to make a physical contact with a switch to indicate completion of a lap.

Another object of the invention is to provide a swimmer counter capable of inverting the statistical display so that the display is readable by the swimmer when moving in either direction.

Another object of this invention is to provide an easily transportable swim timing device for use in any swimming facility and to facilitate personal use as an individual traning timing device.

Another object of the invention is to provide an timer/counter that can be totally immersed in water and which has a reduced risk of electrical shock.

Another object of the invention is to provide a method for processing signals from an athlete and for automatically correcting lap split times based upon analysis of those signals.

Figure 6:
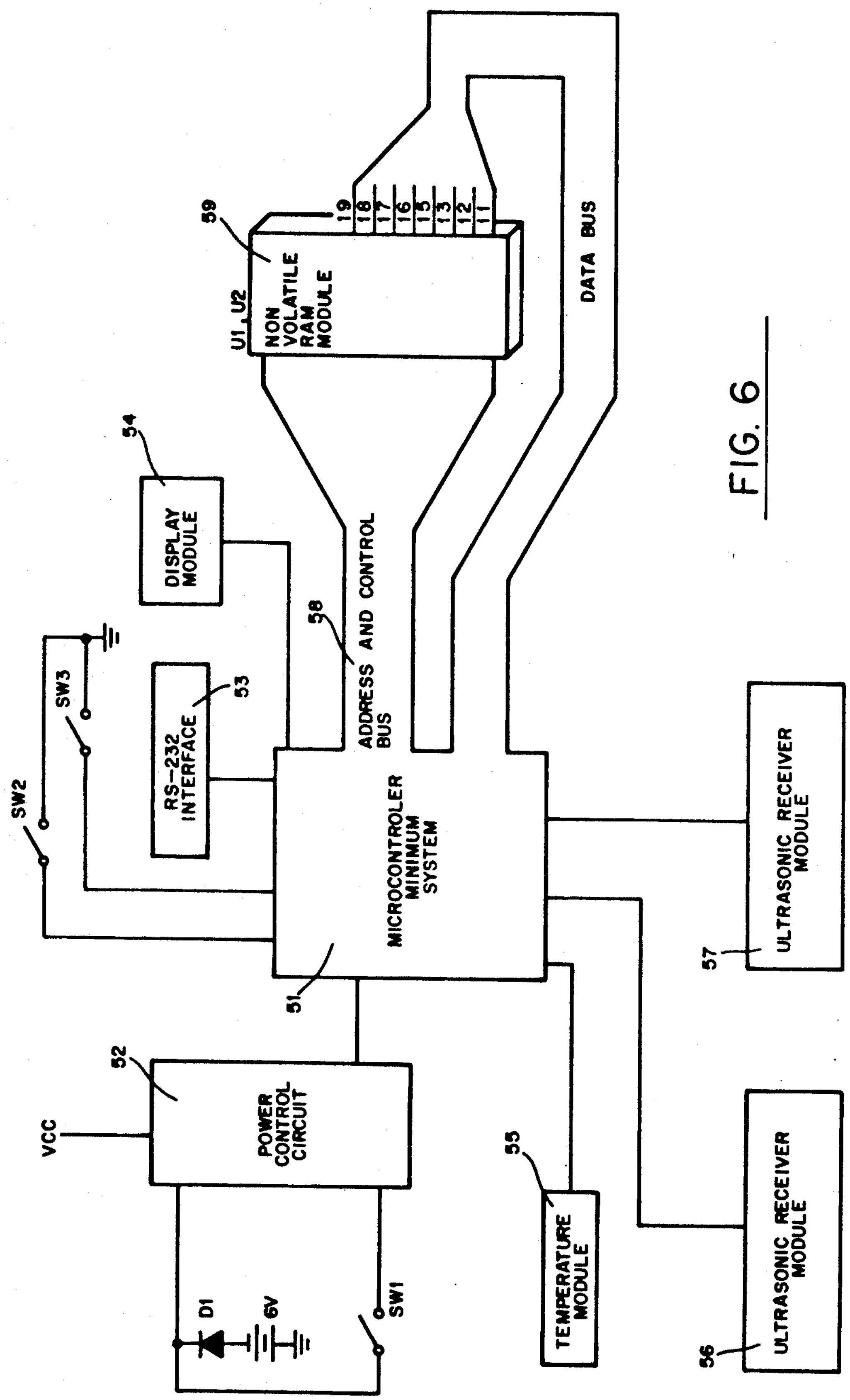
FIG. 6 is a block diagram of electronic circuitry that may be employed in one embodiment of the invention.

The appendix shows source code written in the PL/M language that may be complied and loaded in the memory shown in FIG. 6 to operate the hardware disclosed herein.

SUMMARY OF THE INVENTION

One embodiment of the present invention comprises a waterproof housing with three upwardly projecting digital displays readouts and two spaced ultrasonic receivers or sensors. A swimmer wears an ultrasonic transmitter tuned to the specific frequency of the ultrasonic receivers in the housing. The housing is place on the bottom of a pool within about ten feet of the end of the starting wall of the swimming lane. By measuring the time differential for the ultrasonic signals from the transmitter to reach the two receivers in the housing, the position of the swimmer (i.e., in front of, directly over, or behind the housing), is determined. The timer begins when the diver first enters the water. The display shows the total time and the elasped time for a specific lap. In one embodiment, completion of a lap is identified by determining when the transmitted signal changes from being received by the two receivers by an increasing time differential to being received by a decreasing time differential, although a single receiver employing the doppler effect may also be used. Each time the swimmer passes over the housing, the numbers on the display are oriented so that the swimmer may look down into the water and easily view the time regardless of which direction the swimmer is traveling in the lane or other predetermined course.

DETAILED DESCRIPTION

Figure 1:
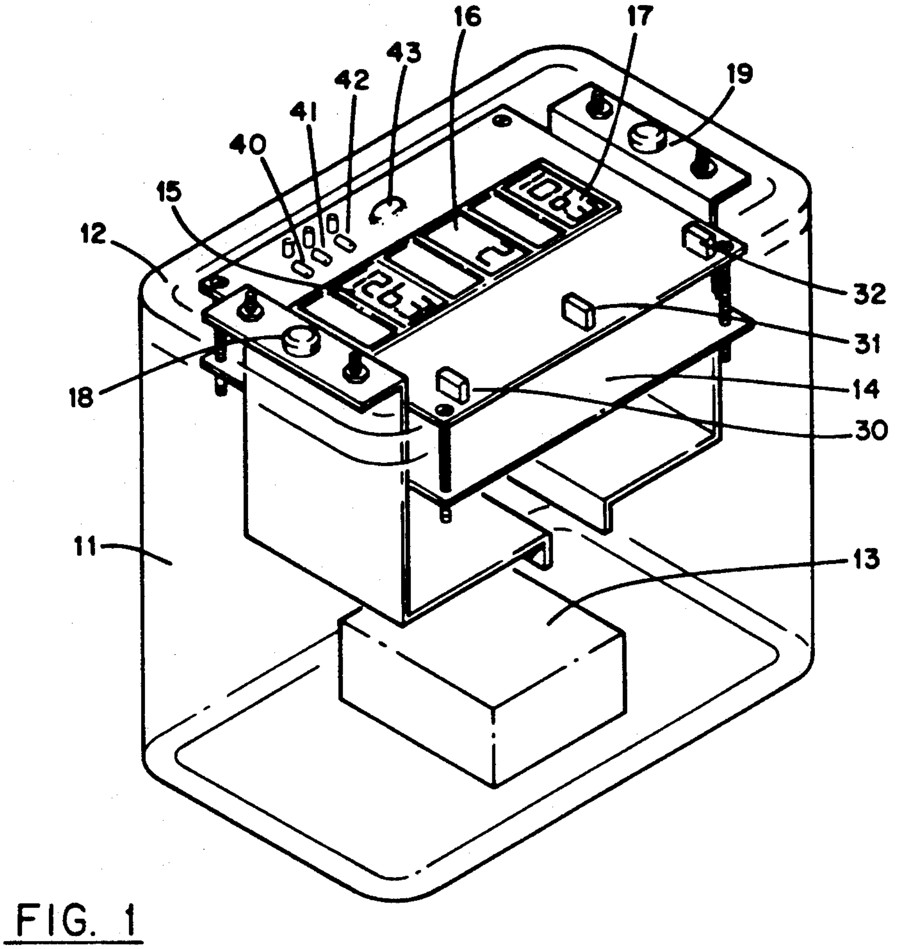
FIG. 1 is a perspective view of one embodiment of a counter/timer of the invention.

As shown in FIG. 1, one embodiment of the invention comprises a translucent, submersible housing 11 that includes a waterproof lid 12 sealed by a gasket (not shown). Housing 11 contains an internal power source such as a rechargeable six volt lead acid battery 13 and electronic components 14. On the top of lid 12 are positioned three upwardly projecting seven segment LCD displays 15, 16 and 17 and first and second receivers 18 and 19. Also mounted near the top of lid 12 are water temperature sensor 43 and first, second and third magnetic reed switches 30, 31 and 32, which may be actuated by a magnet passed in proximity thereto.

Figure 2:
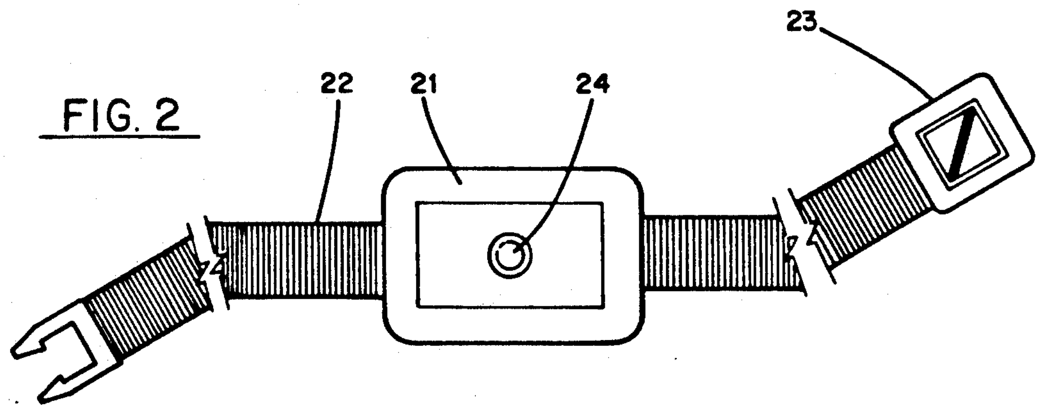
FIG. 2 is a top view of a belt containing an ultrasonic transmitter in accordance with the invention.

In the preferred embodiment, the device is used by a swimmer wearing a battery powered ultrasonic transmitter 24. As shown in FIG. 2, transmitter 24 may be attached to a transmitter housing 21 which may be secured to the swimmer by strap 22 and buckle 23. Transmitter 24 is tuned to the same frequency as receivers 18 and 18, preferably transmits in the frequency range of 20 KHz to 455 KHz, and emits a 4 millisecond pulse every 40 milliseconds. The transmitter is preferably activated by a MOSFET transistor having a gate forward-biased by two terminals exposed to the exterior of the housing so as to be automatically turned on by the change of conductivity when the water is entered, as shown in FIG. 7*h*.

Figure 5:
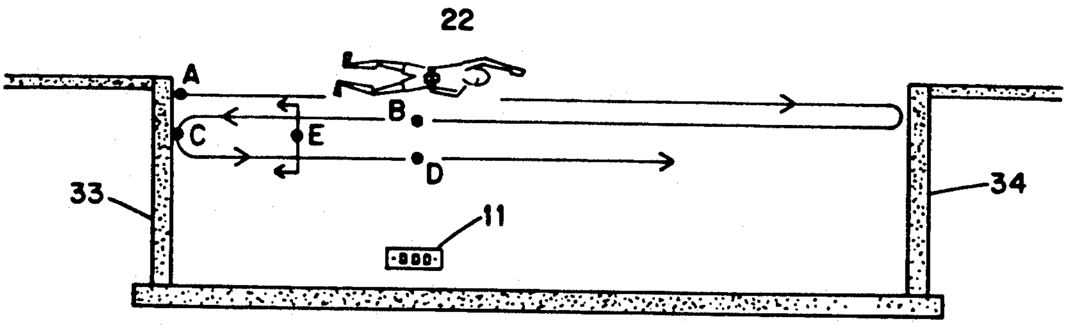
FIG. 5 is a diagrammatic view showing how the invention may be placed in a swim lane and those points along multiple laps when readings are taken to provide the automatic timing correction capability of the invention.

To use the device, the swimmer then places counter housing 11 underwater approximately ten feet from the starting end of the pool lane, as shown in FIG. 5, and activates the device by passing a magnet in proximity to on/off magnetic reed switch 32. The swimmer should stand on the side of the device closest to the starting wall. The device has five operating modes: swim-session, display-data, serial-out, clear-sessions and display temperture. When the device is first turned on, it automatically enters the Swim-session mode. In this mode, the device will sense the pulsing signals from the transmitter worn by the swimmer to determine the direction of the swimmer, and hence, the starting wall. The device will display a series of four dashes in the visual display closest to the swimmer to indicate on which side of the device the starting wall is located. As described below, the swimmer may enter one of the other five modes by actuating the mode select switch as described below. However, assuming another mode is not selected, after about four seconds the top display will display "S-nn" where nn is the current session number about to begin (multiple sets of swim sessions may be stored in the device as described below), the middle display will show a count of 10 and start counting down to 0, and the bottom display (the display closest to the start end) will show all dashes.

If the swimmer wishes to enter a different mode, this may be accomplished by actuating mode select switch 31 until the desired mode is reached. These other modes are indicated by displaying in the middle visual display by the abbreviations SEE (display data mode), PC (serial out mode), CL (Clear-sessions mode), F (display temperature mode), and SESS (swim-session mode , if the swimmer re-enters this mode). Once the desired mode is reached, that mode may be entered by actuating the first magnetic switch 30. For all modes except the display data mode, the user may switch to a different mode be actuating the mode select magnet switch 32 again. To get out of the display data mode, the user must turn off the device by actuating the on-off switch 32, and then turn the device back on by actuating that switch again. Each mode is described in further detail below.

Swim Session Mode: When the swim session mode is selected as noted above, a 10 second countdown begins, which is shown in one of the visual displays in non-inverted format. This period gives the swimmer sufficient time to get out of the pool and prepare to dive in from starting end 33 of the pool lane. Sometime after the ten second period has elasped, the swimmer dives into the water. Upon entering the water, which will occur at some point between A and B (in FIG. 5) for a jump start, receivers 18 and 19 will detect the signal from transmitter 24, and will start both a time counter and a lap counter. Alternatively, the time counter and lap counter will be started when the device detects forward motion toward the timer. The lap counter will start at 1 and will be displayed in second display 16. In the preferred embodiment, the time counter will start with a count of between 0.4 and 1.4 seconds, and preferably 0.9 seconds, to account for the approximate time that elapses between the time the swimmer begins to dive into the water and the time the transmitted signal is first received by the device. Two types of times will be displayed in the visual displays. The lap time will initially be shown in third display 17, and the total elapsed time will be shown in first visual display 15, as shown in FIG. 4.

Figure 3:
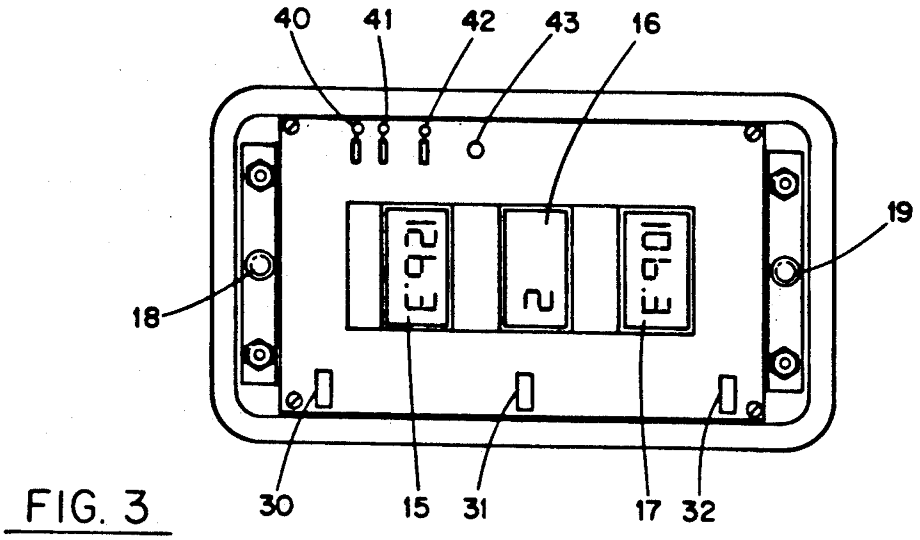
FIG. 3 is a top view of the counter/timer of the invention showing the statistical displays in non-inverted format.
Figure 4:
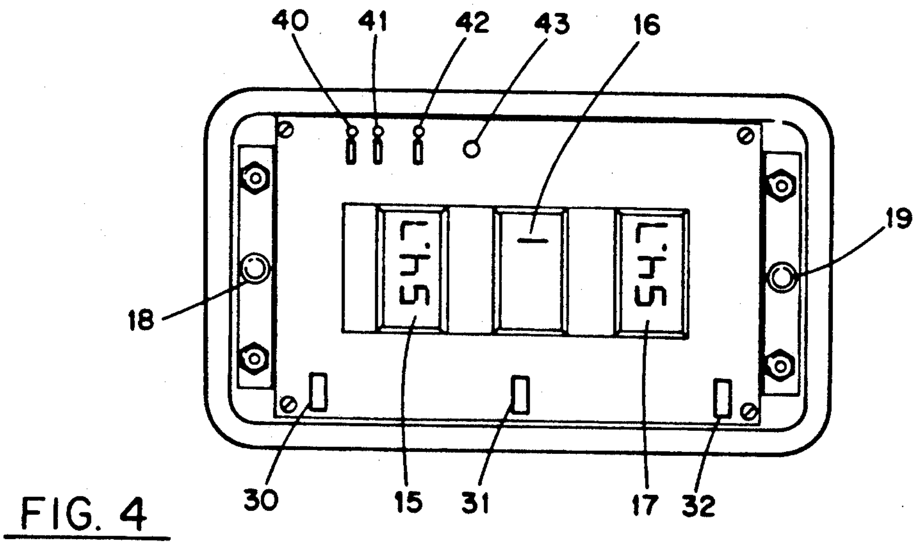
FIG. 4 is a top view of the counter timer of the invention showing the statistical displays in inverted format.

Statistics regarding the swim session are initially displayed in non-inverted format by visual displays 15, 16 and 17 as shown in FIG. 4. Thus, the statistics are readable by the swimmer when the swimmer swims toward the opposite end 34 of the pool lane and looks toward the bottom of the pool. When the swimmer first enters the pool, the signals transmitted by transmitter 24 will reach first receiver 18 before it reaches second receiver 19. As the swimmer swims closer to the device, the time differential between the time the signal reaches the receivers 18 and 19 will decrease. When the swimmer passes over the device, the signal will reach receivers 18 and 19 substantially simultaneously. Approximately 4 seconds after the swimmer passes over the device, the device will invert the statistical displays as shown in FIG. 3. Thus, the displays will be easily readable by the swimmer during the subsequent return portion of the lap. When the displays are inverted, the lap time will be shown in display 15 instead of 17, and the total elapsed time will be shown in display 17 instead of 15. Thus, the lap time will always be the top number, the lap count the middle number and the total time the bottom number.

As the swimmer continues to swim towards opposite wall 34, the signal will reach second receiver 19 before it reaches first receiver 18. This time differential will continue to increase until the swimmer is either out of range of receivers 18 and 19, or until the swimmer reaches opposite end 34 and reverses direction. Thys, when this time differential changes from an increasing amount to a decreasing amount, completion of a half-lap can be detected.

The time differential between receipt of the signal by the receivers will continue to decrease until the swimmer is directly over the device as represented by point B of FIG. 5. At this time, the device will store in memory a reference time constituting the elapsed time at point B. The signal will thereafter be first received by first receiver 18, then by second receiver 19. When the swimmer reaches starting wall 33 and reverse direction as shown at point C, the time differential between receipt of the signal will again change from increasing to decreasing. This is how the preferred embodiment of the device ordinarily detects completion of a lap. At this point, the lap counter shown in second display 16 will be incremented to show that the swimmer is on the next lap, and the lap time display will be frozen and stored as a third reference count. In addition, the displays will again be inverted so that they may be easily read by the swimmer the next time the swimmer passes over the device. When this occurs as shown by point D in FIG. 5, a fourth reference count is stored. In addition, a lap time verification routine is executed. This routine is executed because the third reference time C can sometimes be suspect due to noise in the signals received by receivers 18 and 19. In this routine, the difference between reference times B and D is computed. One half of this amount is taken and added to reference time B. This total, which is herein referred to as C′ will exactly match reference time C if the swimmer took the same amount of time to swim from point B to C as was taken to swim from point C to D. However, this is rarely the case. A time window is computed which consists of the value of C′, plus or minus a predetermined percentage of the difference between reference points B and D. In the preferred embodiment, this percentage is twenty five percent and is represent by range E in FIG. 5. If reference time C is within this time window, then it is assumed to be correct. If it is not within this window, then time reference C is replaced by time reference C′, and the new value is displayed in the updated lap time visual display. The final lap time is also used to compute the lap time for the following time, and the above procedures are repeated for subssequent laps. Each time a lap is completed, the lap time is stored in computer memory.

In the preferred embodiment, the device detects completion of a swim session when it determines that the swimmer has failed to pass back over the device (point D in FIG. 5). Thus the time used to determine the end of the final lap is when the time differential between receipt of the signal by the receivers either begins to remain constant, begins to decrease, or when the signals are no longer received for a predetermined amount of time, indicating that the swimmer has either exited the pool or turned off the transmitter.

After detecting the end of the swim session, the device stops the time counter and displays the total elapsed time, water temperature (in the display previously used to show the lap number), and the last lap elapsed time. The swimmer can then place the device in any of the other four modes described by actuating mode select switch 31.

Display-Data Mode: The Display-Data mode allows the user to view the previously stored data. The user can scan sessions containing lap split times, total elapsed times, and water temperatures. There is a fast and slow scan rate that the user can select. Magnetic switches 30 and 31 serve as scan switches, with switch 31 causing a scan up for a session and switch 30 causing a scan down, Activation of either switch causes the scan rate to be slow initially. However, after approximately two seconds if the switch is still being activated the scan is incrased to the fast rate.

Serial-Out Mode: The Serial-Out mode is used to transmit the previously stored data through an interface port, which is comprised of TXD transmit terminal 40, ground terminal 41 and RXD receiver terminal 42, to a user's personal computer by way of an asynchronous RS 232 serial interface. The transmission commences when a serial byte is received from the personal computer and the transmission terminates when all session data has been transmitted.

Clear-Sessions Mode: The Clear-Sessions mode clears all session data while displaying which sessions are being cleared.

Display-Temperature Mode: The Display-Temperature mode converts the frequency produced by the resistance of a thermistor to a frequency converter circuit into a number that represents the water temperature in degrees Fahrenheit or degrees Celsius. The temperature is displayed on the lap display with a degree sign to the right of the units position.

Figure 7:
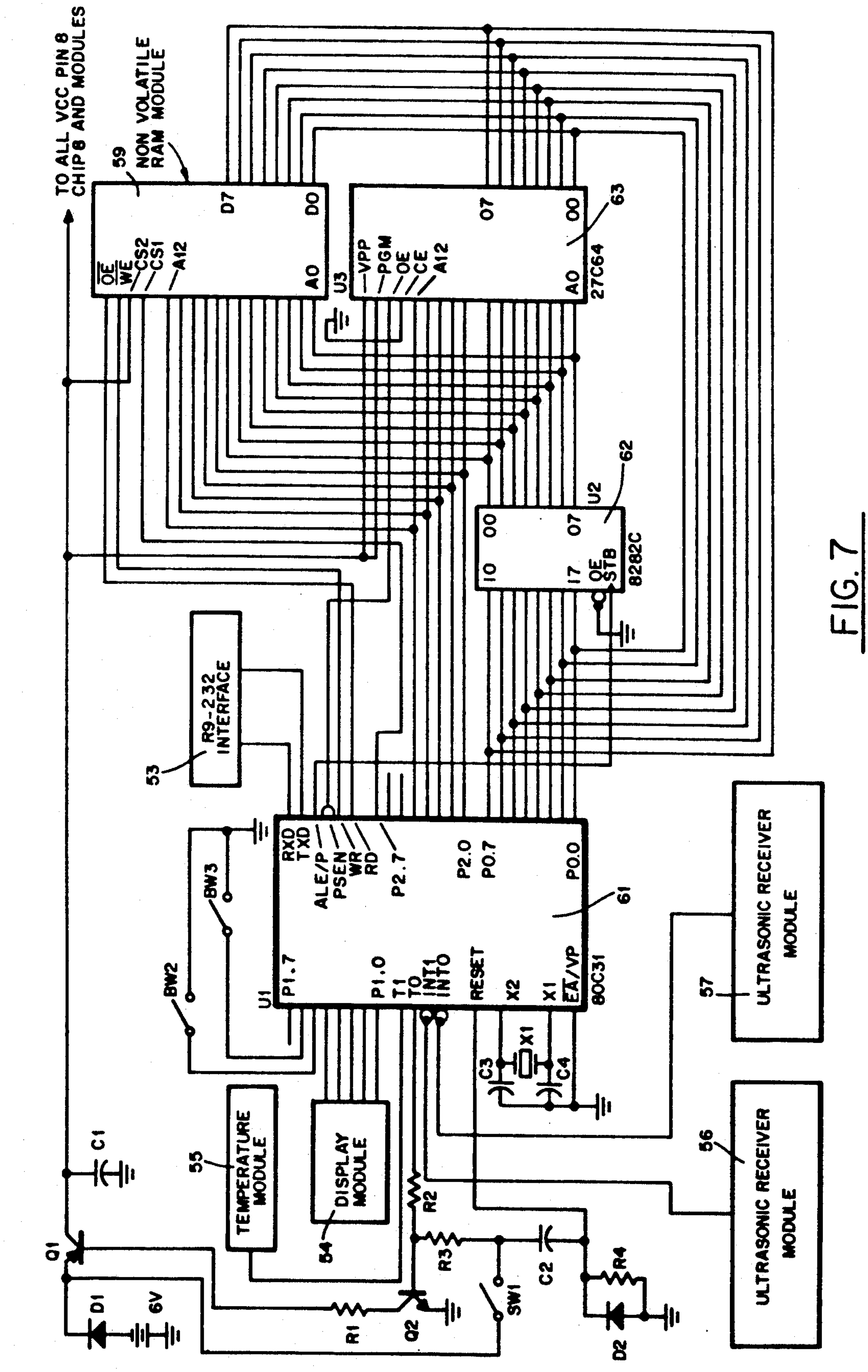
FIG. 7 is a block diagram of a microcontroller based counter/timer in accordance with the present invention.
Figure 7A:
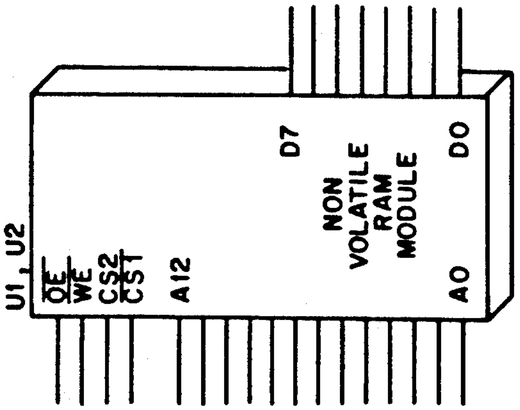
FIGS. 7*a*–7*h* are sub-block diagrams of the microcontroller based counter timer shown in FIG. 7.
Figure 7B:
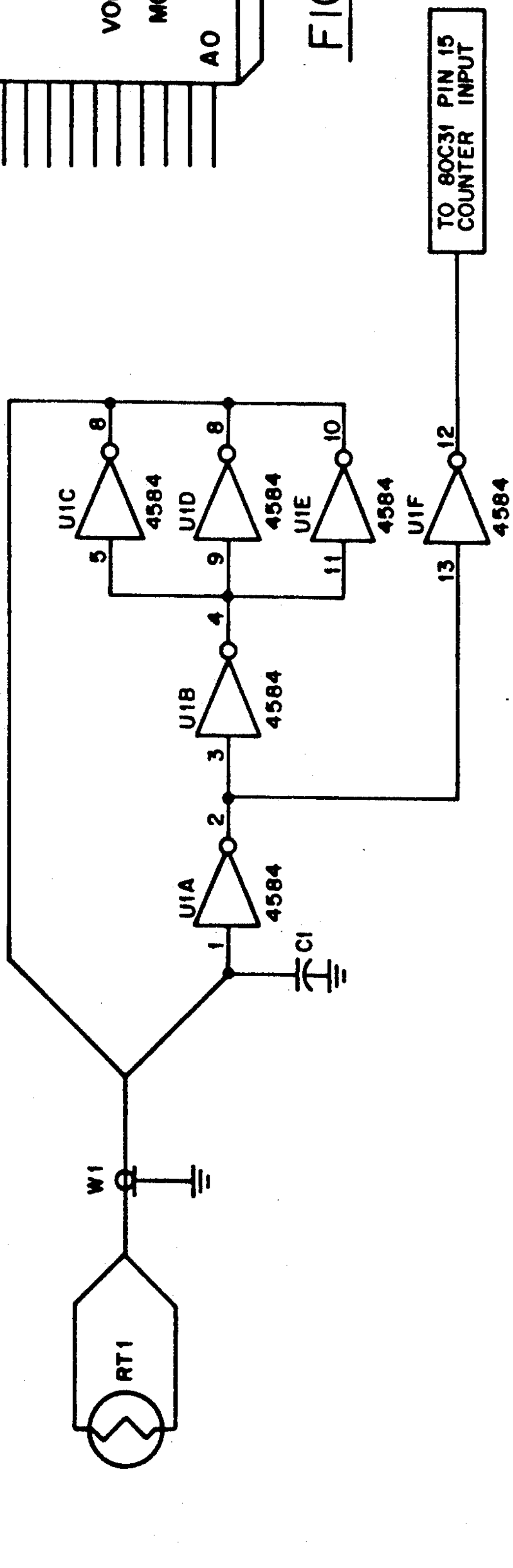
Figure 7C:
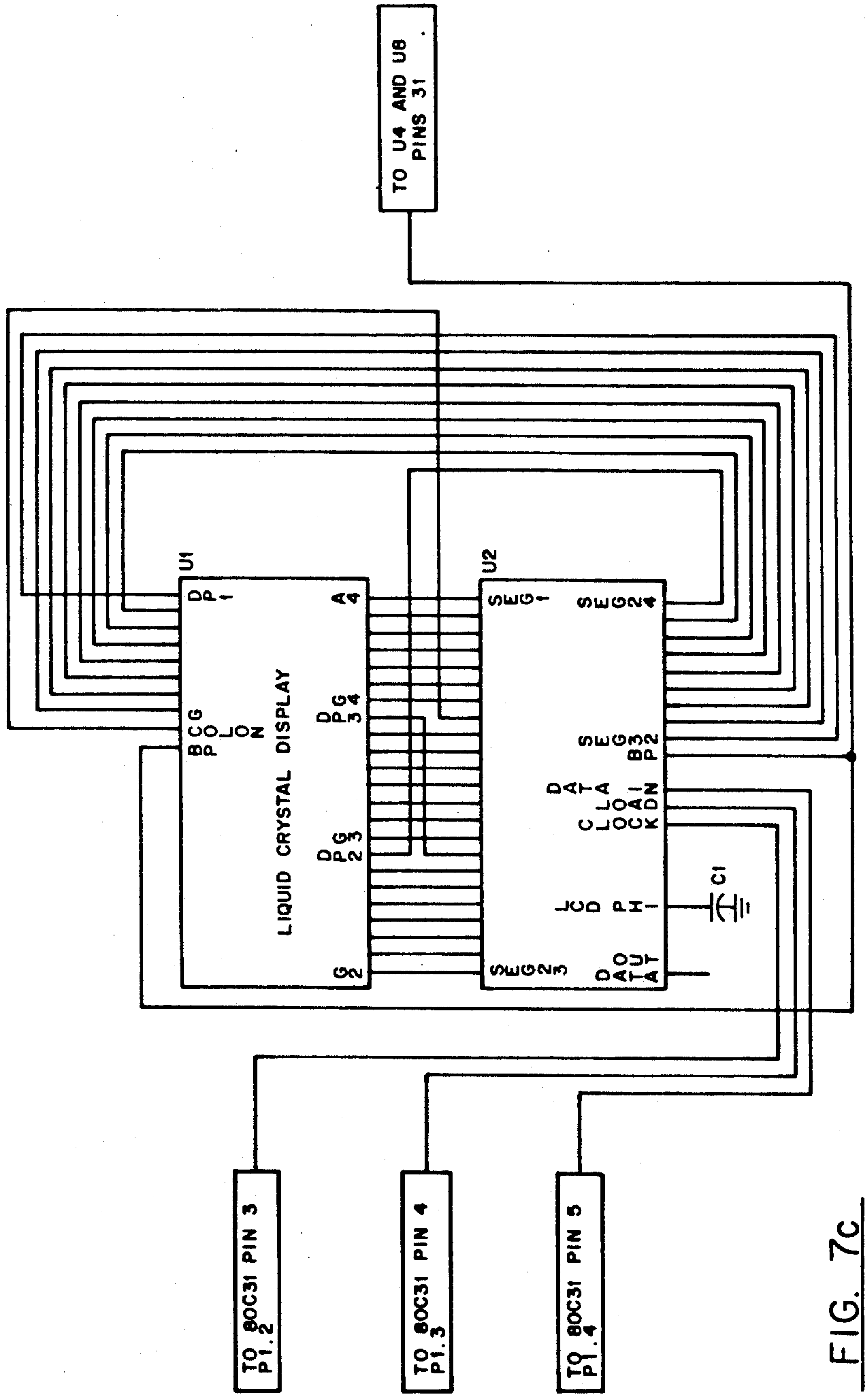
Figure 7D:
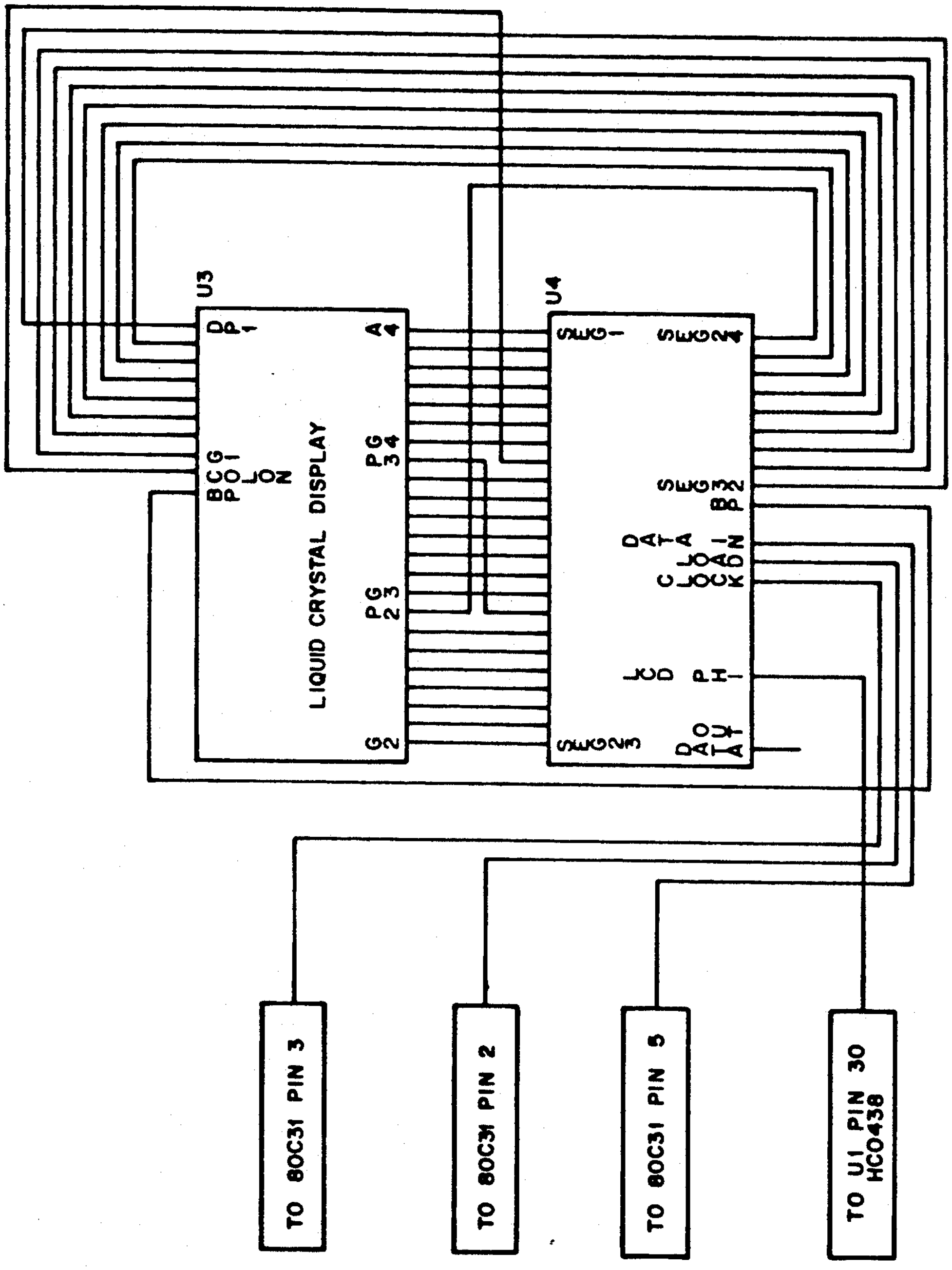
Figure 7E:
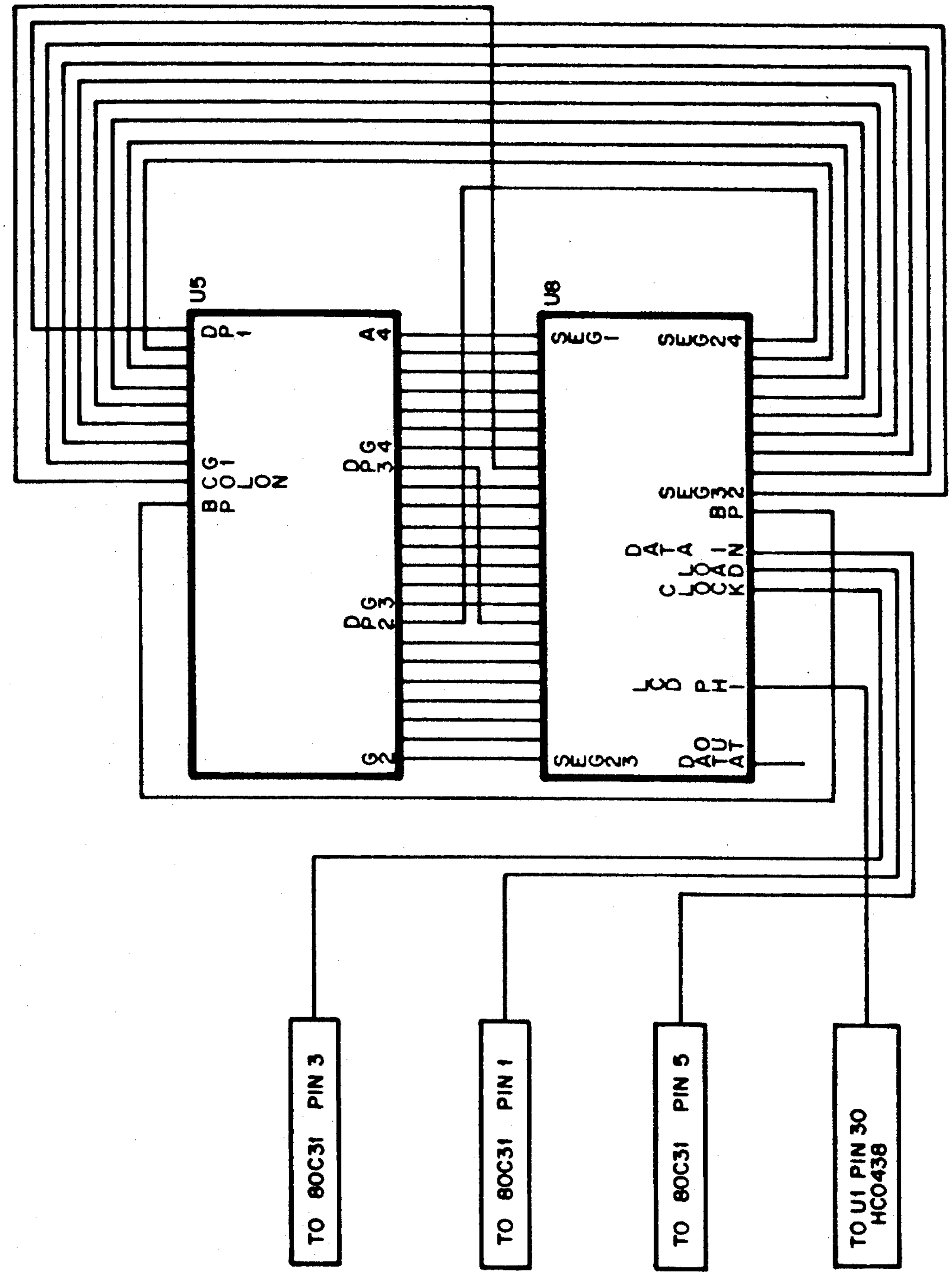
Figure 7F:
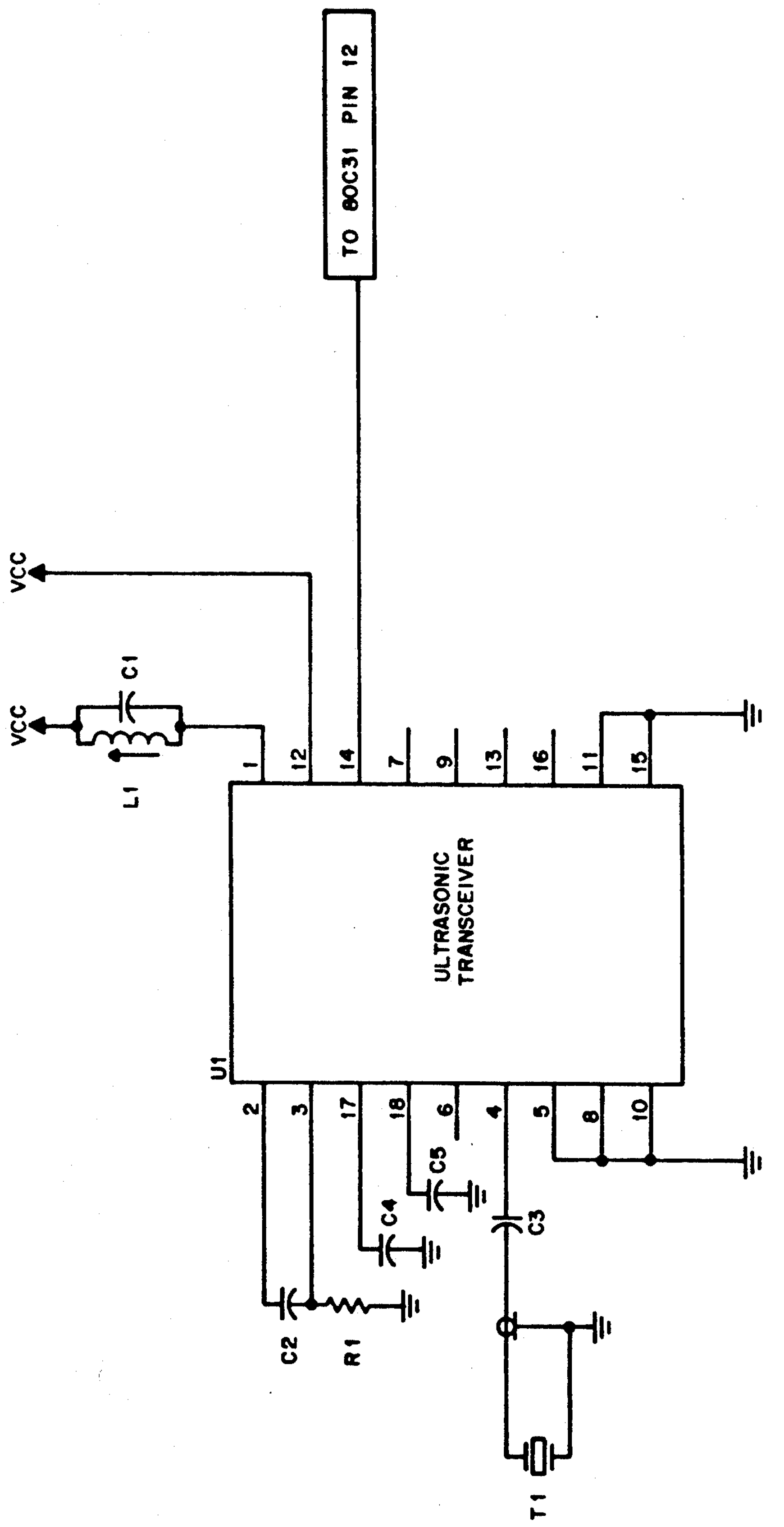
Figure 7G:
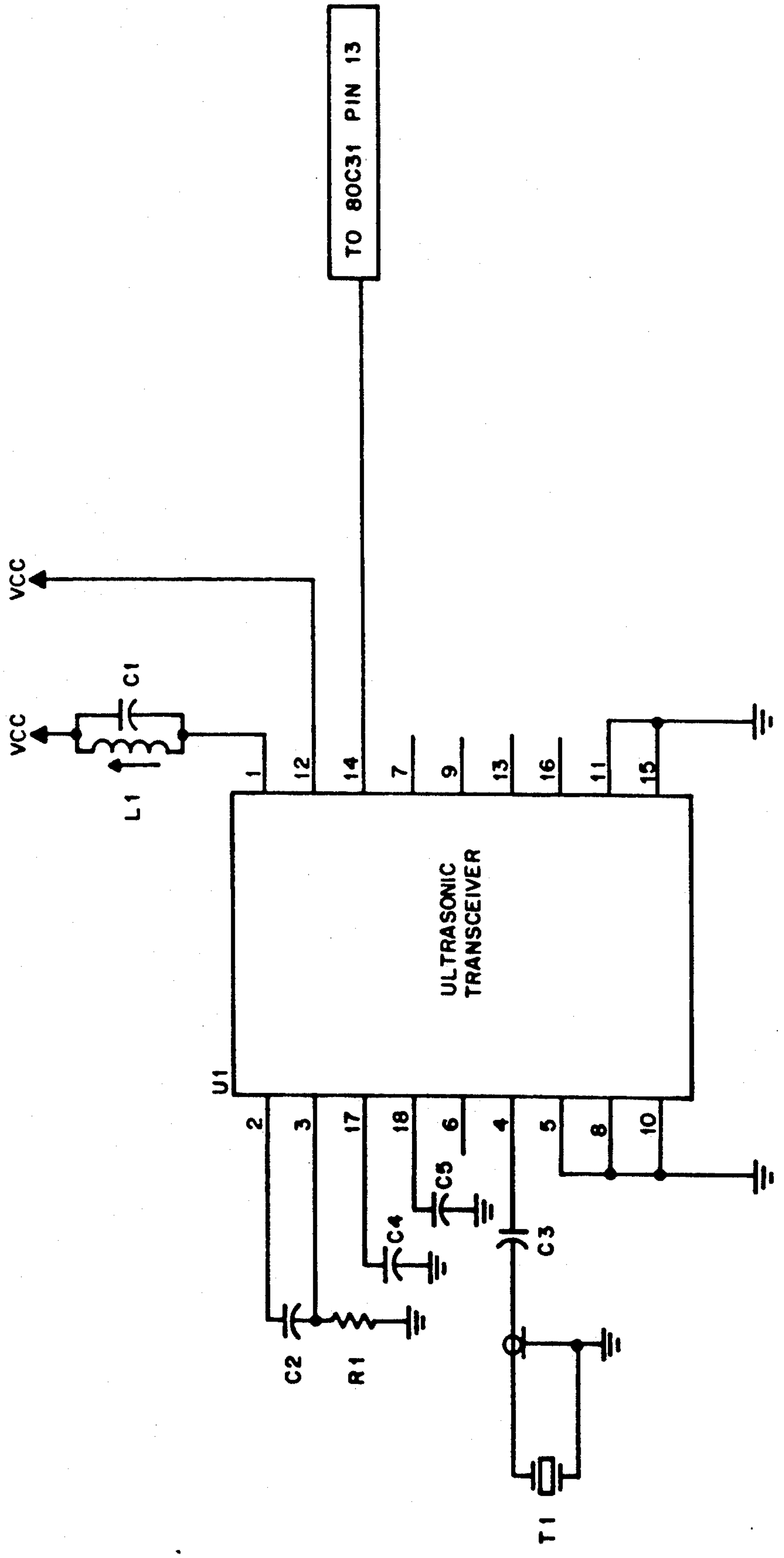
Figure 7H:
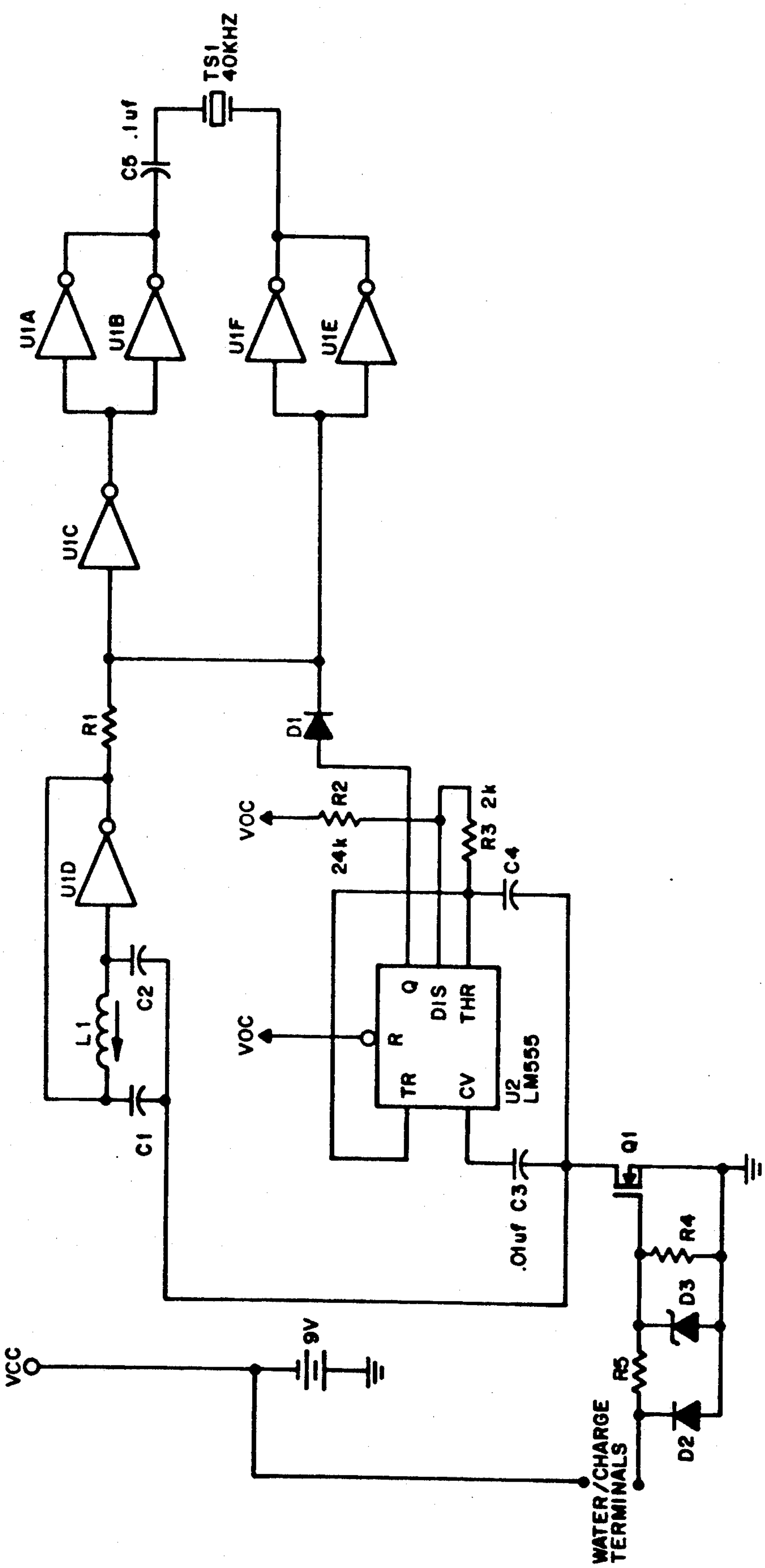

A complete circuit diagram for one embodiment of the present invention is shown in FIGS. 6, 7, and 7*a*–7*h*, and in the appendix. Referring to FIG. 6, the main elements of the device are shown and consist of microcontroller minimum system 51, power control circuit 52, RS-232 interface 53, visual display module 54, temperature module 55, first and second ultrasonic receiver modules 56 and, 57, address and control bus 58, and non-volatile RAM module 59. As shown in FIG. 7, the microcontroller minimum system comprises an 80C31 microprocesor 61, an 8282C integrated circuit 62 and a 27C64 integrated circuit 63. Each non-volatile RAM module is comprised of a HM6264LP 8K CMOS RAM from RCA and Dallas Semiconductor lithium battery powered smart socket, as shown in FIG. 7*a*.

Referring to FIG. 7*b*, the temperature module comprises frequency meter comprised of thermistor RT1, and 0.001 uF timing capacitor C1 coupled to schmidt trigger CMOS digital gates U1A–U1F located on a 4584 integrated circuit chip. FIGS. 7*c*, 7*d* and 7*e* show the three digital display modules. Each liquid crystal display comprises a four digit, seven segment FE202 display driven by a HC0438 driver. Inversion of the displays in accomplished by the software described in the appendix. The ultrasonic receiver circuits are shown in FIGS. 7*f* and 7*g*, and each comprises a National Semiconductor LM1812 ultrasonic transducer chip U1 connected to a 40 KHz transducer T1 and tuned by 15.8 mHz adjustable coil L1 and 1 nF capacitor C1. When a pulse of ultrasound is incident on receiving transducer T1, and electrical signal is produced. This electrical signal is amplified and integrated before it is routed to a theshold sensitive detector. The active low output of each detector is connected to one of the two external interrupts of the microcomputer. The transducer that is closest to the source of the emitted ultrasound initiates an interrupt to the microcomputer when the ultrasound is detected. The transducer furthest from the transmitter initiates an interrupt to the microcomputer some time later (sound propagation time differential between receiver). The microcomputer times the interval between the interrupts and identifies which receiver is closest to the ultrasound source.

FIG. 7*h* shows the transmitter circuit for the transmitter shown in FIG. 2. The battery powered belt-mounted pulsing signal transmitter is comprised of oscillators, an output driver, some logic, a charging circuit, a water-activated conductivity switch, and a transducer (transmitter). The oscillator used for the transmitted frequency is keyed on and off to produce a repetitious burst of transmitted ultrasound. The frequency of the transmitted signal can range from 20 KHz to 455 KHz depending upon the particular unit. The repetition rate of the transmitted signal can range from 10 HZ to 100 HZ and the duty cycle can range from 5–60% also being particular to the unit.

Figure 8:
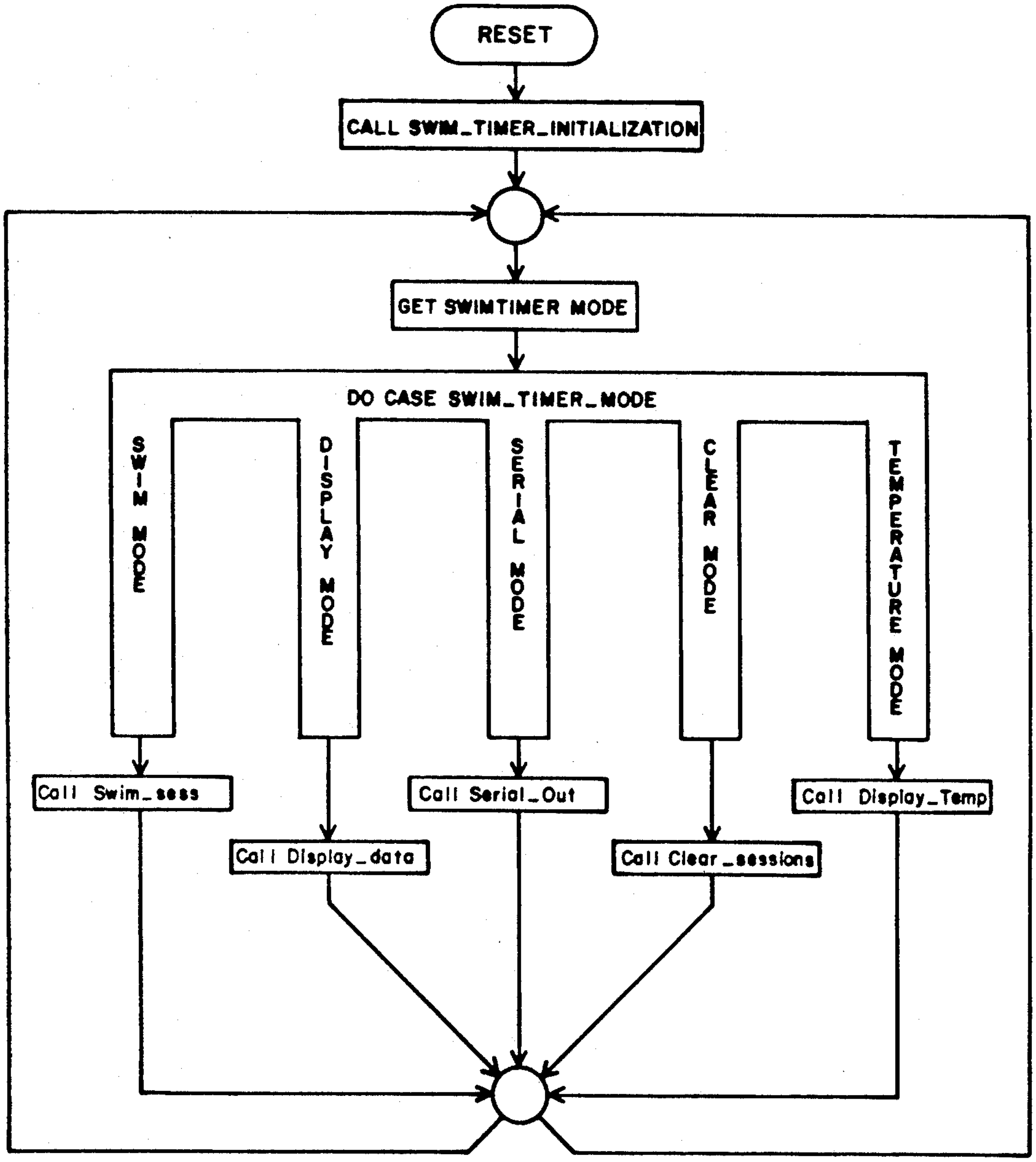
FIG. 8 is a software flow diagram of software that may be used in connection with the circuit shown in FIGS. 6 and 7.

The system further includes the software shown in the Appendix. A flowchart for the basic software appears in FIG. 8. This software handles the microprocessor interrputs and compares the time differential between received pulsed signals. The software also includes logical timers and counters for tracking total times, lap times and lap counts, and updates each elapsed lap time count upon completion of a lap based upon the time differential between the times the pulsing signal reaches the first and second receivers. In the preferred embodiment of the software, counters are updated when the time differential between receipt of the pulses by the two receivers change from increasing to decreasing and the swimmer is at the start end. However, the software could be easily modified to update the counter means based on the being substantially no time difference between the time the pulsing signal reaches the first and second receivers, ie. when a person is directly adjacent to or over the sensor, or based on a change in which receiver receives the signal first. The software also selectively displays the statistics on the visual display in either inverted or non-inverted format.

It will be appreciated to those of skill in the art that numerous changes could be made to the described embodiment of the invention without departing from the spirit of scope of the invention. For example, the disclosed counter/time could easily be used for other types of sporting events, such as runners running laps or vehicles driving around a predetermined course. Because each unit can operate within a relatively narrow bandwidth, it is also contemplated that multiple swimmers could use multiple device simultaneously in the same pool, provided that each swimmer uses a device and transmitter tuned to a different frequency. Although the preferred embodiment utilizes two spaced receivers and a pulsing signal to monitor a swimmer, the present invention contemplates that a continuous transmitted signal could be used with single receiver with a doppler shift system to monitor the position and direction of the swimmer. It is also contemplated that the display inverison feature of the present invention could be used with virtually any other type of sensor for detecting the person or object being monitored. For example, inversion of the displays could be triggered by a sensor based on a mechanical switch or breaking a light beam. Moreover, many other varieties of visual displays, including those that are mechanically based or alphanumeric dot array LCD's could be used instead of the seven segment LCD displays of the preferred embodiment, as long as the visual display is invertible so as to be easily observable by a swimmer swimming in either direction. It is also contemplated that the interface port terminal could be replaced by recently developed magnetically operated transducers or optically operated transducers to provide an interface port in which the components are completely electrically isolated from the exterior of the housing. Also, the magnetically actuated switches on the device could be easily replaced by optical switches or waterproof "feather-touch" switches.

APPENDIX

```
DOS 3.20 (038-N) PL/M-51 V1.2
COMPILER INVOKED BY:  E:\SWIMTIME\PLM51.EXE SWIMMAIN.PLM

                :

             $NOLIST

 1   1       MAIN_SWIM_MODULE:  DO;

 2   2         Swim_Timer_Initialization:      Procedure                         external;
 3   1         End Swim_Timer_Initialization;

 4   2         Swim_Timer_Mode:                Procedure           byte          external;
 5   1         End Swim_Timer_Mode;

 6   2         Swim_Session:                   Procedure                         external;
 7   1         End Swim_Session;

 8   2         Display_Data:                   Procedure                         external;
 9   1         End Display_Data;

10   2         Serial_Out:                     Procedure                         external;
11   1         End Serial_Out;

12   2         Clear_Sessions:                 Procedure                         external;
13   1         End Clear_Sessions;

14   2         Display_Temperature:            Procedure                         external;
15   1         End Display_Temperature;

16   1         Call Swim_Timer_Initialization;

17   1           Main_loop:
                 Do while 1;

18   2             Timer_Function:
                   Do Case Swim_Timer_Mode;

19   3               Swim_Mode:
                     Do;
20   4                 Call Swim_Session;
21   3               End Swim_Mode;

22   3               Display_Mode:
                     Do;
23   4                 Call Display_Data;
24   3               End Display_Mode;

25   3               Serial_Mode:
                     Do;
26   4                 Call Serial_Out;
27   3               End Serial_Mode;

28   3               Clear_Mode:
                     Do;
29   4                 Call Clear_Sessions;
30   3               End Clear_Mode;

31   3               Temperature_Mode:
                     Do;
32   4                 Call Display_Temperature;
33   4               End;

34   2             End Timer_Function;

35   1           End Main_loop;

36   1       End MAIN_SWIM_MODULE;
```

```
MODULE INFORMATION:              (STATIC+OVERLAYABLE)
    CODE SIZE                    = 0035H       53D
    CONSTANT SIZE                = 0000H       0D
    DIRECT VARIABLE SIZE         =   00H+00H   0D+  0D
    INDIRECT VARIABLE SIZE       =   00H+00H   0D+  0D
    BIT SIZE                     =   00H+00H   0D+  0D
    BIT-ADDRESSABLE SIZE         =   00H+00H   0D+  0D
    AUXILIARY VARIABLE SIZE      = 0000H       0D
    MAXIMUM STACK SIZE           = 0004H       4D
    REGISTER-BANK(S) USED:         0
    67 LINES READ
    0 PROGRAM ERROR(S)
END OF PL/M-51 COMPILATION

DOS 3.20 (038-N) PL/M-51 V1.2
COMPILER INVOKED BY:  E:\SWIMTIME\PLM51.EXE SWIMINTL.PLM


             $NOLIST

  1   1      SWIM_TIMER_INIT_MODULE:  DO;

  2   2        Display:  Procedure      (Thousands,Hundreds,Tens,units,Display_Position,
                                         DP_Colon_Position,Format) external;
  3   2          Declare          Thousands              byte                   ;
  4   2          Declare          Hundreds               byte                   ;
  5   2          Declare          Tens                   byte                   ;
  6   2          Declare          units                  byte                   ;
  7   2          Declare          Display_Position       byte                   ;
  8   2          Declare          DP_Colon_Position      byte                   ;
  9   2          Declare          Format                 bit                    ;
 10   1        End Display;

 11   1        Declare          On_Off_Status            byte  public  auxiliary;

 12   1        Declare          Split_Display             bit           external;
 13   1        Declare          Temp_Flag                 bit           external;

 14   1        Declare          Mode_State                byte          external;

 15   1        Declare          Lap                       word          external;
 16   1        Declare          Elapsed_Time              word          external;
 17   1        Declare          Fifty_milliseconds        word          external;

 18   1        Declare          Power_Transistor          bit  at(0B4H) register;
 19   1        Declare          TRO                       bit  at(08CH) register;

 20   1        Declare          Timer_0_high_byte         byte at(08CH) register;
 21   1        Declare          Timer_0_low_byte          byte at(08AH) register;
 22   1        Declare          Timer_mode                byte at(089H) register;
 23   1        Declare          Timer_control             byte at(088H) register;
 24   1        Declare          Interrupt_mask            byte at(0A8H) register;

 25   1        Declare          Mask                      literally      '082H';
 26   1        Declare          Timer_control_byte        literally      '010H';
 27   1        Declare          Timer_mode_byte           literally      '051H';
 28   1        Declare          Initial_high_byte         literally       '5DH';
 29   1        Declare          Initial_low_byte          literally       '3DH';
 30   1        Declare          Blank                     literally        '10';
 31   1        Declare          Normal                    literally         '1';
 32   1        Declare          Start                     literally         '1';
 33   1        Declare          No_Decimal                literally         '0';
 34   1        Declare          Default_State             literally         '0';
 35   1        Declare          Reset_Value               literally         '0';
 36   1        Declare          OFF                       literally         '0';
 37   1        Declare          Not_Frozen                literally         '0';
 38   1        Declare          S_Display                 literally         '0';
 39   1        Declare          Lap_Display               literally         '1';
 40   1        Declare          T_E_T_Display             literally         '2';
```

```
41  2        Swim_Timer_Initialization:                 Procedure      public;

42  2          Declare          Status_Byte                  byte              ;

43  2          Call             Time(250);
44  2          Call             Time(250);
45  2          Call             Time(250);

46  2          Status_Byte                    =           NOT (On_Off_Status);

47  2          Call             Time(250);
48  2          Call             Time(250);

49  2          On_Off_Status                  =                 (Status_Byte);

50  2          Call             Time(250);
51  2          Call             Time(250);
52  2          Call             Time(250);

53  2          Power_Transistor               =        BOOLEAN  (Status_Byte);

54  3          Do While Power_Transistor      =                          OFF;
55  3          End;

56  2          Call       Display (Blank, Blank, Blank, Blank,       S_Display,
                                                        No_Decimal,Normal);

57  2          Call       Display (Blank, Blank, Blank, Blank,     Lap_Display,
                                                        No_Decimal,Normal);

58  2          Call       Display (Blank, Blank, Blank, Blank,   T_E_T_Display,
                                                        No_Decimal,Normal);

59  2          Temp_Flag                      =                   Reset_Value;

60  2          Lap                            =                   Reset_Value;

61  2          Elapsed_Time                   =                   Reset_Value;

62  2          Fifty_milliseconds             =                   Reset_Value;

63  2          Split_Display                  =                    Not_Frozen;

64  2          Timer_mode                     =               Timer_mode_byte;

65  2          Timer_control                  =            Timer_control_byte;

66  2          Interrupt_mask                 =                          Mask;

67  2          Mode_State                     =                 Default_State;

68  2          TRO                            =                         Start;

69  1        End Swim_Timer_Initialization;

70  1      END SWIM_TIMER_INIT_MODULE;


MODULE INFORMATION:               (STATIC+OVERLAYABLE)
    CODE SIZE                     = 00B3H       179D
    CONSTANT SIZE                 = 0000H         0D
    DIRECT VARIABLE SIZE          =   00H+01H     0D+   1D
    INDIRECT VARIABLE SIZE        =   00H+00H     0D+   0D
    BIT SIZE                      =   00H+00H     0D+   0D
    BIT-ADDRESSABLE SIZE          =   00H+00H     0D+   0D
    AUXILIARY VARIABLE SIZE       = 0001H         1D
    MAXIMUM STACK SIZE            = 0002H         2D
    REGISTER-BANK(S) USED:          0
    113 LINES READ
    0 PROGRAM ERROR(S)
END OF PL/M-51 COMPILATION
```

```
DOS 3.20 (038-N) PL/M-51 V1.2
COMPILER INVOKED BY:  E:\SWIMTIME\PLM51.EXE SWIMFUNC.PLM

            $NOLIST

  1   1     SWIM_FUNCTION_MODULE:  DO;

  2   2       Display:  Procedure     (Thousands,Hundreds,Tens,units,Display_Position,
                                                DP_Colon_Position,Format) external;
  3   2         Declare          Thousands                byte                    ;
  4   2         Declare          Hundreds                 byte                    ;
  5   2         Declare          Tens                     byte                    ;
  6   2         Declare          units                    byte                    ;
  7   2         Declare          Display_Position         byte                    ;
  8   2         Declare          DP_Colon_Position        byte                    ;
  9   2         Declare          Format                   bit                     ;
 10   1       End Display;

 11   1       Declare          Mode_State             byte                 public;

 12   1       Declare          Swimmer_Position       bit                external;

 13   1       Declare          No_Decimal                    literally       '0';
 14   1       Declare          Stop                          literally       '0';
 15   1       Declare          Start                         literally       '1';
 16   1       Declare          S_Display                     literally       '0';
 17   1       Declare          Lap_Display                   literally       '1';
 18   1       Declare          T_E_T_Display                 literally       '2';
 19   1       Declare          Blank                         literally      '10';
 20   1       Declare          L                             literally      '16';
 21   1       Declare          Degree_Sign                   literally      '17';
 22   1       Declare          S                             literally       '5';
 23   1       Declare          F                             literally      '14';
 24   1       Declare          C                             literally      '18';
 25   1       Declare          E                             literally      '19';
 26   1       Declare          P                             literally      '20';
 27   1       Declare          Pressed                       literally       '0';
 28   1       Declare          Not_Pressed                   literally       '1';
 29   1       Declare          Middle_Dash                   literally      '12';

 30   1       Declare          Mode_Switch            bit    at(095H)    register;
 31   1       Declare          Enter_Switch           bit    at(096H)    register;

 32   1       Declare          TR0                    bit    at(08CH)    register;

 33   2       Swim_Timer_Mode: Procedure              byte                 public;

 34   3         Do   While      Mode_Switch      =            Pressed;

                  /***************     Stop The Clock!     ***************/
            /*    TR0                              =                Stop; */
                 /*********************************************************/

 35   4           Do While      Enter_Switch     =        Not_Pressed;

 36   4             Mode_Switch                  =        Not_pressed;

 37   4             Mode_State                   =     Mode_State  +  1;
 38   4             IF Mode_State  >    4        Then  Mode_State  =  0;

 40   4             Call  Display      (Middle_Dash,Middle_Dash,Middle_Dash,
                                           Middle_Dash,S_Display,No_Decimal,
                                                         Swimmer_Position);

 41   4             Call  Display      (Middle_Dash,Middle_Dash,Middle_Dash,
                                               Middle_Dash,T_E_T_Display,
                                                No_Decimal,Swimmer_Position);
```

```
42  4          Display_Mode:
               Do Case Mode_State;

43  5            Swim_Session_Mode:
                 Do;
44  6              Call  Display              (S,E,S,S,Lap_Display,
                                                         No_Decimal,
                                                   Swimmer_Position);
45  5            End                              Swim_Session_Mode;

46  5            See_Data_Mode:
                 Do;
47  6              Call  Display          (Blank,S,E,E,Lap_Display,
                                                         No_Decimal,
                                                   Swimmer_Position);
48  5            End                                  See_Data_Mode;

49  5            PC_Data_Mode:
                 Do;
50  6              Call  Display       (Blank,P,C,Blank,Lap_Display,
                                                         No_Decimal,
                                                   Swimmer_Position);
51  5            End                                   PC_Data_Mode;

52  5            Clear_Data_Mode:
                 Do;
53  6              Call  Display       (Blank,C,L,Blank,Lap_Display,
                                                         No_Decimal,
                                                   Swimmer_Position);
54  5            End                                Clear_Data_Mode;

55  5            Water_Temp_Mode:
                 Do;
56  6              Call  Display        (Blank,F,Degree_Sign,Blank,
                                             Lap_Display,No_Decimal,
                                                   Swimmer_Position);
57  5            End                                Water_Temp_Mode;

58  4          End Display_Mode;

59  4          Call        Time(255);
60  4          Call        Time(255);

61  5          Do While    Mode_Switch      =              Pressed;
62  5          End;

63  4          Call        Time(255);
64  4          Call        Time(255);

65  5          Do While    Mode_Switch      =          Not_Pressed
                                           and
                           Enter_Switch     =          Not_Pressed;
66  5          End;

67  4        End;

68  3      End;

        /*****************     Start The Clock!     *****************/
      /*TRO                            =                      Start;*/
        /*************************************************************/

69  2     Return  Mode_State;

70  1     End  Swim_Timer_Mode;

71  1   End Swim_Function_Module;
```

```
MODULE INFORMATION:              (STATIC+OVERLAYABLE)
    CODE SIZE                    = 011FH        287D
    CONSTANT SIZE                = 0000H          0D
    DIRECT VARIABLE SIZE         =   01H+00H     1D+  0D
    INDIRECT VARIABLE SIZE       =   00H+00H     0D+  0D
    BIT SIZE                     =   00H+00H     0D+  0D
    BIT-ADDRESSABLE SIZE         =   00H+00H     0D+  0D
    AUXILIARY VARIABLE SIZE      = 0000H          0D
    MAXIMUM STACK SIZE           = 0002H          2D

DOS 3.20 (038-N) PL/M-51 V1.2
COMPILER INVOKED BY:  E:\SWIMTIME\PLM51.EXE SWIMSESS.PLM


              $NOLIST

  1   1       SWIM_SESSION_MODULE:  Do;

  2   2         Display:  Procedure     (Thousands,Hundreds,Tens,units,Display_Position,
                                               DP_Colon_Position,Format) external;
  3   2           Declare          Thousands             byte                  ;
  4   2           Declare          Hundreds              byte                  ;
  5   2           Declare          Tens                  byte                  ;
  6   2           Declare          units                 byte                  ;
  7   2           Declare          Display_Position      byte                  ;
  8   2           Declare          DP_Colon_Position     byte                  ;
  9   2           Declare          Format                bit                   ;
 10   1         End Display;

 11   2         Swim_initialization:  Procedure                          external;
 12   1         End Swim_initialization;

 13   2         Swim_Timer_Mode:      Procedure          byte            external;
 14   1         End Swim_Timer_Mode;

 15   2         Start_detector:       Procedure                          external;
 16   1         End Start_detector;

 17   2         End_Session:          Procedure                          external;
 18   1         End End_Session;

 19   1         Declare         Display_Format           bit              public;

 20   1         Declare         Swimmer_Position         bit             external;
 21   1         Declare         Initial_Start_End        bit             external;
 22   1         Declare         Split_Display            bit             external;

 23   1         Declare         Session_Index            byte            external;

 24   1         Declare         Lap                      word            external;
 25   1         Declare         Passover_Time            word            external;
 26   1         Declare         Fifty_milliseconds       word            external;
 27   1         Declare         Elapsed_Time             word            external;
 28   1         Declare         Last_Elapsed_Time        word            external;
 29   1         Declare         Split_Freeze_Time        word            external;

 30   1         Declare         TH1                      byte  at(08DH)  register;
 31   1         Declare         TL1                      byte  at(08BH)  register;
 32   1         Declare         Sensor_0_interrupt       bit   at(0A8H)  register;
 33   1         Declare         Sensor_1_interrupt       bit   at(0AAH)  register;
 34   1         Declare         TR0                      bit   at(08CH)  register;
 35   1         Declare         Int0_pin                 bit   at(0B2H)  register;
 36   1         Declare         Int1_pin                 bit   at(0B3H)  register;
 37   1         Declare         Int0_flip_flop           bit   at(089H)  register;
 38   1         Declare         Int1_flip_flop           bit   at(08BH)  register;

 39   1         Declare         Colon                          literally     '4';
 40   1         Declare         No_Decimal                     literally     '0';
 41   1         Declare         S_Display                      literally     '0';
```

```
42   1      Declare        Lap_Display              literally    '1';
43   1      Declare        T_E_T_Display            literally    '2';
44   1      Declare        Tenth_Position           literally    '1';
45   1      Declare        Blank                    literally    '10';
46   1      Declare        Enabled                  literally    '1';
47   1      Declare        Disabled                 literally    '1';
48   1      Declare        Stop                     literally    '0';
49   1      Declare        Reset                    literally    '0';
50   1      Declare        Not_active               literally    '1';
51   1      Declare        Swim_Mode                literally    '0';
52   1      Declare        Frozen                   literally    '1';
53   1      Declare        Not_Frozen               literally    '0';
54   1      Declare        End_Time                 literally    '300';

55   2      Swim_Session:  Procedure                             public;

56   2        Call Swim_initialization;

57   2        Call Start_detector;

58   2        Session_loop:
              Do While Swim_Timer_Mode = Swim_Mode;

              /****** Wait for no activity on Interrupts  before enabling ******/

59   3          If Int0_pin = Not_active  and  Int1_pin = Not_active
                Then
60   4            Do;
61   4              TH1                =      Reset;
62   4              TL1                =      Reset;
63   4              Int0_flip_flop     =      Reset;
64   4              Int1_flip_flop     =      Reset;
65   4              Sensor_0_interrupt =     Enabled;
66   4              Sensor_1_interrupt =     Enabled;
67   4            End;

              /*************          Display data section       *************/

68   3          If Split_Display     =      Frozen
                Then
69   4            Do;
70   4              Call Display
                          (((Elapsed_Time - Last_Elapsed_Time) mod 12000)/1200,
                             ((Elapsed_Time - Last_Elapsed_Time) mod 1200)/200,
                               ((Elapsed_Time - Last_Elapsed_Time) mod 200)/20,
                                 ((Elapsed_Time - Last_Elapsed_Time) mod 20)/2,
                                     S_Display,Tenth_Position,Display_Format);
71   4            End;
72   3          Else
                  Do;
73   4              Call Display
                         (((Fifty_milliseconds - Elapsed_Time) mod 12000)/1200,
                            ((Fifty_milliseconds - Elapsed_Time) mod 1200)/200,
                              ((Fifty_milliseconds - Elapsed_Time) mod 200)/20,
                                ((Fifty_milliseconds - Elapsed_Time) mod 20)/2,
                                     S_Display,Tenth_Position,Display_Format);
74   4            End;


75   3          Call Display                                         (Blank,
                                                 Lap /100,(Lap mod 100)/10,
                                                   Lap  mod 10,Lap_Display,
                                                  No_Decimal,Display_Format);

76   3          Call Display                        (Fifty_milliseconds/12000,
                                           (Fifty_milliseconds mod 12000)/1200,
                                             (Fifty_milliseconds mod 1200)/200,
                                               (Fifty_milliseconds mod 200)/20,
                                           T_E_T_Display,Colon,Display_Format);
```

```
77   3          If  Split_Display               =                 Frozen
                                               and
                Fifty_milliseconds              >        Split_Freeze_Time
                                               and
                Swimmer_Position                =    (NOT Initial_Start_End)

                Then
78   4            Do;
79   4              Lap                         =              Lap    +    1;
80   4              Split_Display               =                Not_Frozen;
81   4              Display_Format              =     NOT Initial_Start_End;
82   4            End;

               /***********        Check for session end        ************/

83   3          If  Swimmer_Position            =         Initial_Start_End
                                               and
                Fifty_milliseconds              >  Passover_Time +   End_Time
                Then
84   4            Do;
85   4              Sensor_0_Interrupt          =                  Disabled;
86   4              Sensor_1_Interrupt          =                  Disabled;
87   4              Call  End_Session;
88   4            End;

89   2        End Session_loop;

90   1      End Swim_Session;

91   1    End SWIM_SESSION_MODULE;
```

```
MODULE INFORMATION:                 (STATIC+OVERLAYABLE)
    CODE SIZE                       = 024CH       588D
    CONSTANT SIZE                   = 0000H         0D
    DIRECT VARIABLE SIZE            =   00H+00H     0D+   0D
    INDIRECT VARIABLE SIZE          =   00H+00H     0D+   0D
    BIT SIZE                        =   01H+00H     1D+   0D
    BIT-ADDRESSABLE SIZE            =   00H+00H     0D+   0D
    AUXILIARY VARIABLE SIZE         = 0000H         0D
    MAXIMUM STACK SIZE              = 0002H         2D
    REGISTER-BANK(S) USED:            0
    161 LINES READ
    0 PROGRAM ERROR(S)
END OF PL/M-51 COMPILATION

DOS 3.20 (038-N) PL/M-51 V1.2
COMPILER INVOKED BY:  E:\SWIMTIME\PLM51.EXE SWIMINIT.PLM
```

```
              $NOLIST

 1   1        SWIMTIME_INITIALIZATION_MODULE:  DO;

 2   2          Display:  Procedure     (Thousands,Hundreds,Tens,units,Display_Position,
                                              DP_Colon_Position,Format) external;
 3   2            Declare          Thousands                byte                   ;
 4   2            Declare          Hundreds                 byte                   ;
 5   2            Declare          Tens                     byte                   ;
 6   2            Declare          units                    byte                   ;
 7   2            Declare          Display_Position         byte                   ;
 8   2            Declare          DP_Colon_Position        byte                   ;
 9   2            Declare          Format                   bit                    ;
10   1          End Display;
```

```
11   2      Session_Value:   Procedure(Session_Number,Lap_Num) Word      external;
12   2        Declare        Session_Number              byte                    ;
13   2        Declare        Lap_Num                     word                    ;

14   1      End Session_Value;

15   2      Swim_Timer_Mode: Procedure                   byte                external;
16   1      End Swim_Timer_Mode;


17   1      Declare            Initial_start_end                bit           public;

18   1      Declare            Session_Index                    byte        external;

19   1      Declare            Swimmer_position                 bit         external;
20   1      Declare            Last_swimmer_position            bit         external;
21   1      Declare            Split_Display                    bit         external;

22   1      Declare            Fifty_milliseconds_overflow     byte         external;
23   1      Declare            Swimmer_position_byte           byte         external;
24   1      Declare            Slope                           byte         external;

25   1      Declare            Fifty_milliseconds              word         external;
26   1      Declare            Current_sensor_diff             word         external;
27   1      Declare            Passover_time                   word         external;
28   1      Declare            Passover_time_diff              word         external;
29   1      Declare            Elapsed_Time                    word         external;
30   1      Declare            Last_Elapsed_Time               word         external;

31   2    Swim_initialization:  Procedure                                     public;

32   2      Declare            Timer_mode            byte   at(089H)   register;
33   2      Declare            Timer_control         byte   at(088H)   register;
34   2      Declare            Interrupt_mask        byte   at(0A8H)   register;
35   2      Declare            TH1                   byte   at(08DH)   register;
36   2      Declare            TL1                   byte   at(08BH)   register;

37   2      Declare            TR0                   bit    at(08CH)   register;
38   2      Declare            TR1                   bit    at(08EH)   register;
39   2      Declare            Sensor_0_interrupt    bit    at(0A8H)   register;
40   2      Declare            Sensor_1_interrupt    bit    at(0AAH)   register;
41   2      Declare            Int0_flip_flop        bit    at(089H)   register;
42   2      Declare            Int1_flip_flop        bit    at(08BH)   register;
43   2      Declare            Int0_pin              bit    at(0b2h)   register;
44   2      Declare            Int1_pin              bit    at(0b3h)   register;

45   2      Declare            Mask                         literally    '087H';
46   2      Declare            Timer_control_byte           literally    '005H';
47   2      Declare            Timer_mode_byte              literally    '011H';
48   2      Declare            Reset                        literally    '000H';
49   2      Declare            Enabled                      literally    '001H';
50   2      Declare            Disabled                     literally    '000H';
51   2      Declare            Four_seconds                 literally    '0080';
52   2      Declare            Ten_seconds                  literally    '0200';
53   2      Declare            Initial_sensor_diff          literally    '0040';
54   2      Declare            Blank                        literally      '10';
55   2      Declare            Slope_Reset                  literally      '21';
56   2      Declare            Not_Frozen                   literally       '0';
57   2      Declare            Start                        literally       '1';
58   2      Declare            Stop                         literally       '0';
59   2      Declare            Swim_Mode                    literally       '0';
60   2      Declare            Interrupt_0_end              literally       '0';
61   2      Declare            Interrupt_1_end              literally       '1';
62   2      Declare            Low_Dash                     literally      '11';
63   2      Declare            Middle_Dash                  literally      '12';
64   2      Declare            S                            literally      '05';
65   2      Declare            F                            literally      '14';
66   2      Declare            U                            literally      '15';
67   2      Declare            L                            literally      '16';
68   2      Declare            No_Decimal                   literally       '0';
```

```
69   2   Declare   S_Display         literally   '0';
70   2   Declare   Lap_Display       literally   '1';
71   2   Declare   T_E_T_Display     literally   '2';
72   2   Declare   First_Lap         literally   '1';
73   2   Declare   Max_Index         literally   '9';

74   2   Timer_mode                 =   Timer_mode_byte;
75   2   Timer_control              =   Timer_control_byte;
76   2   Swimmer_position_byte      =   Reset;
77   2   Slope                      =   Slope_Reset;
78   2   Split_Display              =   Not_Frozen;
79   2   Fifty_milliseconds         =   Reset;
80   2   Current_sensor_diff        =   Reset;
81   2   Passover_time_diff         =   Reset;
82   2   Passover_time              =   Reset;
83   2   Elapsed_Time               =   Reset;
84   2   Last_Elapsed_Time          =   Reset;

85   2   Call      Display     (Blank,Blank,Blank,Blank,
                               S_Display,No_Decimal,Reset);

86   2   Call      Display     (Blank,Blank,Blank,Blank,
                               Lap_Display,No_Decimal,Reset);

87   2   Call      Display     (Blank,Blank,Blank,Blank,
                               T_E_T_Display,No_Decimal,Reset);


88   2   Interrupt_mask             =   Mask;

89   2   TR1                        =   Start;
90   2   TR0                        =   Start;
91   2   Int0_pin                   =   Start;
92   2   Int1_pin                   =   Start;

93   2   Wait_four_seconds:
           Do while Fifty_milliseconds     <     Four_seconds
                                          and
                    Swim_Timer_Mode        =     Swim_mode;

              /********        Show Start Wall End        ********/

94   3       Call     Display          (Blank,Blank,Blank,Blank,
                         S_Display,No_Decimal,Swimmer_Position);

95   3       Call     Display    (Low_Dash,Low_Dash,Low_Dash,Low_Dash,
                         T_E_T_Display,No_Decimal,Swimmer_Position);

96   3        TH1                   =   Reset;
97   3        TL1                   =   Reset;
98   3        Int0_flip_flop        =   Reset;
99   3        Int1_flip_flop        =   Reset;

100  3        Sensor_0_interrupt    =   Enabled;
101  3        Sensor_1_interrupt    =   Enabled;
102  2     End                          Wait_four_seconds;

103  2   Initial_start_end          =   Swimmer_position;

104  2   Session_Index              =   Reset;

105  2   Find_Clear_Session:
         Do      While
                 Session_Value(Session_Index,First_Lap)  <>   Reset
                                                        and
                                        Session_Index   <=   Max_Index;
106  3     Session_Index      =         Session_Index   +    1;
107  2   End                                       Find_Clear_Session;

108  2   IF  Session_Index     >                       Max_Index
         Then
```

```
109  3        Do;
110  3          Call    Display              (F,U,L,L,S_Display,
                                   No_Decimal,Swimmer_Position);

111  3          Call    Display            (F,U,L,L,Lap_Display,
                                   No_Decimal,Swimmer_Position);

112  3          Call    Display          (F,U,L,L,T_E_T_Display,
                                   No_Decimal,Swimmer_Position);

113  3          Wait_On_Mode_Change:
                Do While Swim_Timer_Mode   =          Swim_Mode;
114  3          End                          Wait_On_Mode_Change;
115  3        End;
116  2      Else
              Do;
117  3          TRO                        =                    Stop;
118  3          Sensor_0_interrupt         =                Disabled;
119  3          Sensor_1_interrupt         =                Disabled;
120  3          TH1                        =                   Reset;
121  3          TL1                        =                   Reset;
122  3          Int0_flip_flop             =                   Reset;
123  3          Int1_flip_flop             =                   Reset;
124  3          Fifty_milliseconds         =                   Reset;
125  3          Int0_pin                   =                   Start;
126  3          Int1_pin                   =                   Start;

127  3          Call   Display     (S,Middle_Dash,(Session_Index + 1)/10,
                                          (Session_Index + 1) mod 10,
                                  S_Display,No_Decimal,Swimmer_Position);

128  3          Call   Display     (Blank,Blank,Blank,Blank,T_E_T_Display,
                                            No_Decimal,Swimmer_Position);

129  3          TRO                        =                   Start;

                /*********************************************************/
                /********  Wait for swimmer to reach starting point ********/
                /*********************************************************/

130  3          Wait_ten_seconds:
                Do while Fifty_milliseconds        <          Ten_seconds
                                                  and
                           Swim_Timer_Mode         =           Swim_mode;

131  4            Call Display                                (Blank,0,
                                     (Ten_seconds - Fifty_milliseconds)/20,
                                           Blank,Lap_Display,No_Decimal,
                                                      swimmer_position);

132  3          End                                     Wait_ten_seconds;

133  3          TRO                        =                    Stop;

134  3          Fifty_milliseconds         =                   Reset;

135  3        End;

136  1      End swim_initialization;

137  1    END SWIMTIME_INITIALIZATION_MODULE;
```

```
MODULE INFORMATION:              (STATIC+OVERLAYABLE)
    CODE SIZE                    = 022FH       559D
    CONSTANT SIZE                = 0000H         0D
    DIRECT VARIABLE SIZE         =   00H+00H     0D+   0D
```

```
    INDIRECT VARIABLE SIZE       =  00H+00H    0D+  0D
    BIT SIZE                     =  01H+00H    1D+  0D
    BIT-ADDRESSABLE SIZE         =  00H+00H    0D+  0D
    AUXILIARY VARIABLE SIZE      = 0000H       0D
    MAXIMUM STACK SIZE           = 0002H       2D
    REGISTER-BANK(S) USED:         0
    221 LINES READ
    0 PROGRAM ERROR(S)
END OF PL/M-51 COMPILATION

DOS 3.20 (038-N) PL/M-51 V1.2
COMPILER INVOKED BY:  E:\SWIMTIME\PLM51.EXE SWIMSTRT.PLM


               $NOLIST

  1   1        Start_detector_module:  Do;

  2   2          Swim_Timer_Mode:   Procedure              byte                  external;
  3   1          End Swim_Timer_Mode;

  4   1          Declare           Four_seconds                     literally        '80';
  5   1          Declare           Start                            literally         '1';
  6   1          Declare           Enabled                          literally         '1';
  7   1          Declare           Reset                            literally         '0';
  8   1          Declare           Initial_start_value              literally        '21';
  9   1          Declare           Start_delay                      literally         '6';
 10   1          Declare           Jump_start_delay                 literally        '10';
 11   1          Declare           Jump_start_threshold             literally        '24';
 12   1          Declare           Frozen                           literally         '1';
 13   1          Declare           Stop                             literally         '0';
 14   1          Declare           Swim_Mode                        literally         '0';

 15   1          Declare           Swimmer_Position        bit                       external;
 16   1          Declare           Initial_Start_End       bit                       external;

 17   1          Declare           Split_Display           bit                       external;
 18   1          Declare           Display_Format          bit                       external;

 19   1          Declare           Slope                   byte                      external;

 20   1          Declare           Lap                     word                      external;
 21   1          Declare           Fifty_milliseconds      word                      external;
 22   1          Declare           Elapsed_Time            word                      external;
 23   1          Declare           Last_Elapsed_Time       word                      external;

 24   1          Declare           TH1                     byte     at(08DH)         register;
 25   1          Declare           TL1                     byte     at(08BH)         register;
 26   1          Declare           TR0                     bit      at(08CH)         register;
 27   1          Declare           Sensor_0_interrupt      bit      at(0A8H)         register;
 28   1          Declare           Sensor_1_interrupt      bit      at(0AAH)         register;

 29   1          Declare           Int0_flip_flop          bit      at(089H)         register;
 30   1          Declare           Int1_flip_flop          bit      at(08BH)         register;


 31   2          Start_detector:   Procedure                                          public;

 32   2            Slope                         =                    Initial_start_value;

 33   2            Wait_For_Start_Or_Mode_Change:
                   Do while Swimmer_Position     =                      Initial_Start_End
                                                and
                   Swim_Timer_Mode               =                              Swim_Mode;

 34   3              TH1                         =                                  Reset;
 35   3              TL1                         =                                  Reset;
 36   3              Int0_flip_flop              =                                  Reset;
 37   3              Int1_flip_flop              =                                  Reset;
```

```
 38   3            Sensor_0_interrupt         =                          Enabled;
 39   3            Sensor_1_interrupt         =                          Enabled;
 40   3            If Split_Display           =                           Frozen
                   Then
 41   4              Do;
 42   4                TRO                    =                           Start;
 43   4              End;
 44   2          End                                   Wait_For_Start_Or_Mode_Change;

 45   2          TRO                          =                            Stop;

 46   2          If         Swim_Timer_Mode   =                        Swim_Mode
                 Then
 47   2            Start_Correction:
                   Do;
 48   3              If Fifty_milliseconds    <              Jump_start_threshold
                     Then
 49   4                Do;
 50   4                  Fifty_milliseconds   =   Fifty_milliseconds  +  Jump_start_delay;
 51   4                End;
 52   3              Else
                       Do;
 53   4                  Fifty_milliseconds   =  Fifty_milliseconds   +       Start_delay;
 54   4                End;

 55   3              Elapsed_Time             =                            Reset;
 56   3              Last_Elapsed_Time        =                            Reset;
 57   3              TRO                      =                            Start;
 58   3              Split_Display            =                      NOT  Frozen;
 59   3              Display_Format           =            NOT  Initial_Start_End;
 60   3              Lap                      =                                1;
 61   2            End                                          Start_Correction;

 62   1        End Start_detector;

 63   1      End Start_detector_module;
```

```
MODULE INFORMATION:                 (STATIC+OVERLAYABLE)
    CODE SIZE                       = 007DH        125D
    CONSTANT SIZE                   = 0000H         0D
    DIRECT VARIABLE SIZE            =    00H+00H    0D+   0D
    INDIRECT VARIABLE SIZE          =    00H+00H    0D+   0D
    BIT SIZE                        =    00H+00H    0D+   0D
    BIT-ADDRESSABLE SIZE            =    00H+00H    0D+   0D
    AUXILIARY VARIABLE SIZE         = 0000H         0D
    MAXIMUM STACK SIZE              = 0002H         2D
    REGISTER-BANK(S) USED:            0
    101 LINES READ
    0 PROGRAM ERROR(S)
END OF PL/M-51 COMPILATION

DOS 3.20 (038-N) PL/M-51 V1.2
COMPILER INVOKED BY:  E:\SWIMTIME\PLM51.EXE SWIMCHCK.PLM
```

```
              $NOLIST

  1   1       EXTERNAL_INTERRUPT_MODULE:  DO;

  2   2         Store:         Procedure(Total_elapsed_time,Lap,Split) Using 1 external;
  3   2           Declare      Total_elapsed_time         word                         ;
  4   2           Declare      Lap                        word                         ;
  5   2           Declare      Split                      word                         ;
  6   1         End Store;

  7   1         Declare        Latch                                literally       '0';
  8   1         Declare        Reset                                literally       '0';
  9   1         Declare        Interrupt_0_end                      literally       '1';
 10   1         Declare        First_Lap                            literally       '1';
```

```
11   1   Declare   Frozen                        literally   '1';
12   1   Declare   Interrupt_1_end               literally   '0';
13   1   Declare   Interrupt_0_end_threshold     literally   '3';
14   1   Declare   Interrupt_1_end_threshold     literally   '18';
15   1   Declare   Four_Seconds                  literally   '80';

16   1   Declare   TR1                     bit   at(08EH)   register;
17   1   Declare   Int0_pin                bit   at(0b2h)   register;
18   1   Declare   Int1_pin                bit   at(0b3h)   register;
19   1   Declare   TH1                     byte  at(08DH)   register;
20   1   Declare   TL1                     byte  at(08BH)   register;

21   1   Declare   Initial_start_end       bit              external;
22   1   Declare   Split_Display           bit              external;

23   1   Declare   Fifty_milliseconds      word             external;
24   1   Declare   Last_Elapsed_Time       word             external;
25   1   Declare   Elapsed_Time            word             external;
26   1   Declare   Lap                     word             external;

27   1   Declare   Swimmer_position        bit              public;
28   1   Declare   Last_swimmer_position   bit              public;

29   1   Declare   Swimmer_position_byte   byte             public;

30   1   Declare   Passover_time           word             public;
31   1   Declare   Passover_time_diff      word             public;
32   1   Declare   Split_Freeze_Time       word             public;

33   2   Turn_check:   Procedure           using 1          external;
34   1   End Turn_check;

35   2   Sensor_passover_check:   Procedure   using 1               ;
36   2     If Swimmer_position        <>        Last_swimmer_position
           Then
37   3       Do;
38   3         If Swimmer_position     =        Initial_start_end
               Then
39   4           Do;
40   4             Passover_time       =        Fifty_milliseconds;
41   4           End;
42   3         Else
                 Do;
43   4             Passover_time_diff  =  Fifty_milliseconds - passover_time;
44   4             Split_Freeze_Time   =  Fifty_milliseconds +  Four_Seconds;
45   4             If Split_Display       =                 Frozen
                   Then
46   5               Do;
47   5                 If             Elapsed_Time  -   Passover_time
                                                  <
                                     3 * SHR(Passover_time_diff,3)
                                                  or
                                      Elapsed_Time -   Passover_time
                                                  >
                                     5 * SHR(Passover_time_diff,3)
                       Then
48   6                   Do;
49   6                     Elapsed_Time =
                               Passover_time + SHR(Passover_time_diff,1);

50   6                     Call Store              (Elapsed_Time,Lap,
                                   Elapsed_Time - Last_Elapsed_Time);
51   6                   End;
52   5               End;
53   4             Else
                     Do;
54   5                 Last_Elapsed_Time       =        Elapsed_Time;
55   5                 Elapsed_Time            =
                               Passover_time + SHR(Passover_time_diff,1);
```

```
56   5              Call          Store               (Elapsed_Time,  Lap,
                                  Elapsed_Time   -     Last_Elapsed_Time);
57   5            End;
58   4          End;
59   3        End;
60   1      End Sensor_passover_check;


61   2      Int0_interrupt:  Procedure interrupt 0 using 1;

62   2        TR1 = Int1_pin;
63   2        If TR1 = latch
              then

64   3          Do;
65   3            Call Turn_check;
66   3          End;

67   2        Else

                Do;
68   3            TL1                          =                      Reset;
69   3            TH1                          =                      Reset;
70   3            TR1                          =                   Int1_pin;
71   3            Swimmer_position_byte        =  (9*Swimmer_position_byte)/10;
72   3            If Swimmer_position_byte    <=    Interrupt_0_end_threshold
              Then

73   4            Do;
74   4              Last_swimmer_position      =            Swimmer_position;
75   4              Swimmer_position           =             Interrupt_0_end;
76   4              Call                              Sensor_passover_check;
77   4            End;

78   3            Int0_pin                     =                      latch;
79   3            TR1                          =                   Int1_pin;
80   3          End;

81   1      End Int0_interrupt;


82   2      Int1_interrupt:  Procedure interrupt 2 using 1;

83   2        TR1 = Int0_pin;
84   2        If TR1 = latch
              then

85   3          Do;
86   3            Call Turn_check;
87   3          End;

88   2        Else

                Do;
89   3            TL1                          =                            Reset;
90   3            TH1                          =                            Reset;
91   3            TR1                          =                         Int0_pin;
92   3            Swimmer_position_byte        =  (9*Swimmer_position_byte + 30)/10;
93   3            If Swimmer_position_byte    >=          Interrupt_1_end_threshold
              Then

94   4            Do;
95   4              Last_swimmer_position      =                  Swimmer_position;
96   4              Swimmer_position           =                   Interrupt_1_end;
97   4              Call                                    Sensor_passover_check;
98   4            End;

99   3            Int1_pin                     =                            latch;
100  3            TR1                          =                         Int0_pin;
101  3          End;
```

```
102   1        End Intl_interrupt;

103   1      END EXTERNAL_INTERRUPT_MODULE;



WARNINGS:
    2 IS THE HIGHEST USED INTERRUPT


MODULE INFORMATION:                (STATIC+OVERLAYABLE)
    CODE SIZE                      = 0181H       385D
    CONSTANT SIZE                  = 0000H         0D
    DIRECT VARIABLE SIZE           =    07H+00H    7D+   0D
    INDIRECT VARIABLE SIZE         =    00H+00H    0D+   0D
    BIT SIZE                       =    02H+00H    2D+   0D
    BIT-ADDRESSABLE SIZE           =    00H+00H    0D+   0D
    AUXILIARY VARIABLE SIZE        = 0000H         0D
    MAXIMUM STACK SIZE             = 000FH        15D
    REGISTER-BANK(S) USED:           1
    164 LINES READ
    0 PROGRAM ERROR(S)
END OF PL/M-51 COMPILATION

DOS 3.20 (038-N) PL/M-51 V1.2
COMPILER INVOKED BY:  E:\SWIMTIME\PLM51.EXE SWIMTURN.PLM


              $NOLIST

  1   1       TURN_MODULE:  DO;

  2   2         Store:          Procedure(Total_elapsed_time,Lap,Split) Using 1 external;
  3   2           Declare       Total_elapsed_time       word                            ;
  4   2           Declare       Lap                      word                            ;
  5   2           Declare       Split                    word                            ;
  6   1         End Store;

  7   1         Declare         Unlatch                          literally        '1';
  8   1         Declare         Active                           literally        '0';
  9   1         Declare         Inactive                         literally        '1';
 10   1         Declare         Reset                            literally        '0';
 11   1         Declare         Negative                         literally        '0';
 12   1         Declare         Positive                         literally        '1';
 13   1         Declare         Interrupt_0_end                  literally        '0';
 14   1         Declare         Interrupt_1_end                  literally        '1';
 15   1         Declare         Interrupt_0_end_threshold        literally        '3';
 16   1         Declare         Interrupt_1_end_threshold        literally        '8';
 17   1         Declare         Turn_threshold                   literally        '1';
 18   1         Declare         Hysteresis                       literally        '0';
 19   1         Declare         Disabled                         literally        '0';
 20   1         Declare         First_Lap                        literally        '1';
 21   1         Declare         Freeze                           literally        '1';
 22   1         Declare         Not_Frozen                       literally        '0';

 23   1         Declare         Sensor_0_interrupt       bit     at(0A8H)     register;
 24   1         Declare         Sensor_1_interrupt       bit     at(0AAH)     register;
 25   1         Declare         Int0_pin                 bit     at(0b2h)     register;
 26   1         Declare         Int1_pin                 bit     at(0b3h)     register;
 27   1         Declare         TH1                      byte    at(08DH)     register;
 28   1         Declare         TL1                      byte    at(08BH)     register;

 29   1         Declare         Fifty_milliseconds       word                 external;

 30   1         Declare         Initial_Start_End        bit                  external;
 31   1         Declare         Swimmer_Position         bit                  external;
```

```
1      Declare         Display_Format         bit             external;

1      Declare         Slope_sign             bit               public;
1      Declare         Split_Display          bit               public;

1      Declare         Slope                  byte              public;

1      Declare         Lap                    word              public;
1      Declare         Elapsed_Time           word              public;
1      Declare         Last_Elapsed_Time      word              public;

1      Declare         Last_Value             word              public;
1      Declare         Current_sensor_diff    word              public;

2      Turn_check:     Procedure              using 1           public;

2        Declare       Timer_value                                word;

2        Last_value       =              Current_sensor_diff;
2        Timer_value      =     SHR(SHL(DOUBLE(TH1),8) OR TL1,2);

2        Current_sensor_diff =  (Last_value * 11 + Timer_value)/12;

2        If Swimmer_Position    =         Initial_Start_End
                               and
           Split_Display        =                Not_Frozen
         Then
3          Do;

3            Update_Slope:
             Do;
4              If Last_value      >             Current_sensor_diff
               Then
5                Do;
5                  Slope          =                  (4* Slope)/10;
5                  Slope_sign     =                      Negative;
5                End;

4              Else
                 Do;
5                  Slope          =            (19 * Slope + 84)/22;
5                  Slope_sign     =                      Positive;
5                End;
3            End                                     Update_Slope;


3              If                          (Slope_sign  =  Negative
                                                    and
                                            Slope < Turn_threshold)
               Then
4                Do;
4                  Last_Elapsed_Time      =            Elapsed_Time;
4                  Elapsed_Time           =      Fifty_Milliseconds;
4                  Call Store                     (Elapsed_Time,Lap,
                                 Elapsed_Time  -  Last_Elapsed_Time);

4                  Split_Display          =                  Freeze;
4                  Display_Format         =       Initial_Start_End;
4                End;
3          End;

2        Else
           Do;
3            Slope      =       21;
3          End;

2        TH1               =    Reset;
2        TL1               =    Reset;
```

```
 73   2          Sensor_0_interrupt = Disabled;
 74   2          Sensor_1_interrupt = Disabled;
 75   2          Int0_pin           =  unlatch;
 76   2          Int1_pin           =  unlatch;

 77   1        End Turn_check;

 78   1      END TURN_MODULE;


MODULE INFORMATION:                  (STATIC+OVERLAYABLE)
    CODE SIZE                        = 00E3H        227D
    CONSTANT SIZE                    = 0000H          0D
    DIRECT VARIABLE SIZE             =   0BH+02H     11D+  2D
    INDIRECT VARIABLE SIZE           =   00H+00H      0D+  0D
    BIT SIZE                         =   02H+00H      2D+  0D
    BIT-ADDRESSABLE SIZE             =   00H+00H      0D+  0D
    AUXILIARY VARIABLE SIZE          = 0000H          0D
    MAXIMUM STACK SIZE               = 0002H          2D
    REGISTER-BANK(S) USED:             1
    119 LINES READ
    0 PROGRAM ERROR(S)
END OF PL/M-51 COMPILATION

DOS 3.20 (038-N) PL/M-51 V1.2
COMPILER INVOKED BY:  E:\SWIMTIME\PLM51.EXE SWIMSTOR.PLM


              $NOLIST

  1   1       STORE_MODULE:  DO;

  2   1         Declare          Session_Index                          byte      public;

  3   1         Declare          Session (10)        structure    (Swim_Times (401) word)
                                                     public                   auxiliary;

  4   2         Store:      Procedure (Total_Elapsed_Time,Lap,Split)   Using 1   public;

  5   2           Declare          Total_Elapsed_Time        word                       ;
  6   2           Declare          Split                     word                       ;
  7   2           Declare          Lap                       word                       ;

  8   2           If                     Session_Index          <                 10
                  Then
  9   3             Do;
 10   3               Session(Session_Index).Swim_Times(0)     =    Total_Elapsed_Time;
 11   3               Session(Session_Index).Swim_Times(Lap)   =                Split;
 12   3             End;

 13   1         End Store;

 14   1       END STORE_MODULE;


MODULE INFORMATION:                  (STATIC+OVERLAYABLE)
    CODE SIZE                        = 0040H         64D
    CONSTANT SIZE                    = 0000H          0D
    DIRECT VARIABLE SIZE             =   01H+06H      1D+  6D
    INDIRECT VARIABLE SIZE           =   00H+00H      0D+  0D
    BIT SIZE                         =   00H+00H      0D+  0D
    BIT-ADDRESSABLE SIZE             =   00H+00H      0D+  0D
    AUXILIARY VARIABLE SIZE          = 1F54H       8020D
    MAXIMUM STACK SIZE               = 0002H          2D
    REGISTER-BANK(S) USED:             1
    29 LINES READ
    0 PROGRAM ERROR(S)
END OF PL/M-51 COMPILATION
```

```
        $NOLIST

 1  1   END_SESSION_MODULE:  DO;

 2  2     Water_Temperature:  Procedure                    byte          external;
 3  1     End Water_Temperature;

 4  2     Swim_Timer_Mode:      Procedure                  byte          external;
 5  1     End Swim_Timer_Mode;

 6  2     Swim_Timer_Initialization:  Procedure                          external;
 7  1     End Swim_Timer_Initialization;

 8  2     Display:  Procedure     (Thousands,Hundreds,Tens,units,Display_Position,
                                         DP_Colon_Position,Format) external;
 9  2       Declare           Thousands           byte                      ;
10  2       Declare           Hundreds            byte                      ;
11  2       Declare           Tens                byte                      ;
12  2       Declare           units               byte                      ;
13  2       Declare           Display_Position    byte                      ;
14  2       Declare           DP_Colon_Position   byte                      ;
15  2       Declare           Format              bit                       ;
16  1     End Display;


17  1     Declare        Session (10)    Structure      (Swim_Times (401) word)
                                         external                   auxiliary;

18  1     Declare        Session_Temperature(10)  byte   external    auxiliary;

19  1     Declare        Fifty_milliseconds     word                 external;
20  1     Declare        Passover_Time          word                 external;
21  1     Declare        Passover_Time_Diff     word                 external;
22  1     Declare        Last_Elapsed_Time      word                 external;
23  1     Declare        Elapsed_Time           word                 external;
24  1     Declare        Lap                    word                 external;

25  1     Declare        Session_Index          byte                 external;

26  1     Declare        Initial_Start_End      bit                  external;
27  1     Declare        Split_Display          bit                  external;

28  1     Declare        Reset                          literally         '0';
29  1     Declare        Not_Frozen                     literally         '0';
30  1     Declare        No_Decimal                     literally         '0';
31  1     Declare        Colon                          literally         '4';
32  1     Declare        S_Display                      literally         '0';
33  1     Declare        Lap_Display                    literally         '1';
34  1     Declare        T_E_T_Display                  literally         '2';
35  1     Declare        Tenth_Position                 literally         '1';
36  1     Declare        Blank                          literally        '10';
37  1     Declare        Swim_Mode                      literally         '0';
38  1     Declare        Degree_Sign                    literally        '17';
39  1     Declare        Elapsed_Time_Limit             literally       '200';
40  1     Declare        Time_Out_Value                 literally      '6000';
41  1     Declare        Max_Lap                        literally       '400';

42  2     End_Session:      Procedure                                 public;

43  2       If Split_Display       =                             Not_Frozen
            Then
44  3         Do;
45  3           Last_Elapsed_Time  =                           Elapsed_Time;
46  3         End;

47  2       If Elapsed_Time        -  Passover_Time     >   Elapsed_Time_Limit
            Then
48  3         Do;
49  3           Elapsed_Time       =  Passover_Time     +  Passover_Time_Diff/2;
50  3         End;
```

```
51   2      Session(Session_Index).Swim_Times(0)          =          Elapsed_Time;

52   2      Session(Session_Index).Swim_Times(Lap)        =        Elapsed_Time -
                                                                 Last_Elapsed_Time;

53   2      Zero_Rest_Of_Laps:
            Do     While          Lap                     <                Max_Lap;
54   3        Lap                                         =      Lap     +       1;
55   3        Session(Session_Index).Swim_Times(Lap)      =                      0;
56   2      End                                                  Zero_Rest_Of_Laps;

57   2      Session_Temperature(Session_Index)            =      Water_Temperature;

58   2      Call Display     (((Elapsed_Time - Last_Elapsed_Time) mod 12000)/1200,
                                ((Elapsed_Time - Last_Elapsed_Time) mod 1200)/200,
                                  ((Elapsed_Time - Last_Elapsed_Time) mod 200)/20,
                                    ((Elapsed_Time - Last_Elapsed_Time) mod 20)/2,
                                      S_Display,Tenth_Position,Initial_Start_End);

59   2      Call Display        (Elapsed_Time/12000,(Elapsed_Time mod 12000)/1200,
                                                   (Elapsed_Time mod 1200)/200,
                                                     (Elapsed_Time mod 200)/20,
                                          T_E_T_Display,Colon,Initial_Start_End);

60   2      Fifty_milliseconds                            =                 Reset;

61   2      Wait_For_Mode_Change:
            Do While Swim_Timer_Mode                      =             Swim_Mode;
62   3        If Fifty_milliseconds                       >        Time_Out_Value
              Then
63   4          Do;
64   4            Call Swim_Timer_Initialization;

65   4            Session_Index                           =    Session_Index  - 1;
66   4            If Session_Index                        >                     9
                  Then
67   5              Do;
68   5                Session_Index                       =                     0;
69   5              End;

70   4          End;

71   3        Call Display              (Blank,(Water_Temperature mod 100)/10,
                           Water_Temperature mod 10,Degree_Sign,Lap_Display,
                                            No_Decimal,Initial_Start_End);

72   2        End                                             Wait_For_Mode_Change;

73   1      End End_Session;

74   1    END END_SESSION_MODULE;
```

```
MODULE INFORMATION:                 (STATIC+OVERLAYABLE)
    CODE SIZE                       = 0212H      530D
    CONSTANT SIZE                   = 0000H      0D
    DIRECT VARIABLE SIZE            =   00H+00H  0D+  0D
    INDIRECT VARIABLE SIZE          =   00H+00H  0D+  0D
    BIT SIZE                        =   00H+00H  0D+  0D
    BIT-ADDRESSABLE SIZE            =   00H+00H  0D+  0D
    AUXILIARY VARIABLE SIZE         = 0000H      0D
    MAXIMUM STACK SIZE              = 0004H      4D
    REGISTER-BANK(S) USED:            0
    128 LINES READ
    0 PROGRAM ERROR(S)
END OF PL/M-51 COMPILATION
```

```
 1   1   DISPLAY_DATA_MODULE:  DO;

 2   2     Display:  Procedure     (Thousands,Hundreds,Tens,units,Display_Position,
                                          DP_Colon_Position,Format) external;
 3   2       Declare           Thousands               byte                     ;
 4   2       Declare           Hundreds                byte                     ;
 5   2       Declare           Tens                    byte                     ;
 6   2       Declare           units                   byte                     ;
 7   2       Declare           Display_Position        byte                     ;
 8   2       Declare           DP_Colon_Position       byte                     ;
 9   2       Declare           Format                  bit                      ;
10   1     End Display;

11   2     Session_Value:  Procedure(Session_Number,Lap_Num) Word        external;
12   2       Declare       Session_Number          byte                         ;
13   2       Declare       Lap_Num                 word                         ;

14   1     End Session_Value;

15   1     Declare         Session_Temperature(10)  byte    public      auxiliary;

16   1     Declare         Fifty_Milliseconds       word                 external;

17   1     Declare         Session_Index            byte                 external;

18   1     Declare         Swimmer_Position         bit                  external;

19   1     Declare         Lap_Num                  word                         ;

20   1     Declare         Tic_Count                byte                         ;

21   1     Declare         Reset                    literally                '0';
22   1     Declare         Stop                     literally                '0';
23   1     Declare         Start                    literally                '1';
24   1     Declare         Pressed                  literally                '0';
25   1     Declare         Not_Pressed              literally                '1';
26   1     Declare         Degree_Sign              literally               '17';
27   1     Declare         Colon                    literally                '4';
28   1     Declare         Tenth_Position           literally                '1';
29   1     Declare         No_Decimal               literally                '0';
30   1     Declare         S_Display                literally                '0';
31   1     Declare         Lap_Display              literally                '1';
32   1     Declare         T_E_T_Display            literally                '2';
33   1     Declare         S                        literally                '5';
34   1     Declare         Blank                    literally               '10';
35   1     Declare         Middle_Dash              literally               '12';
36   1     Declare         Max_Lap_Num              literally              '400';
37   1     Declare         Initial_High_Byte        literally              '5DH';
38   1     Declare         Initial_Low_Byte         literally              '3DH';
39   1     Declare         Timer_0                  literally              '01H';
40   1     Declare         Timer_Mask               literally              '82H';

41   1     Declare         Up                       bit    at(096H)     register;
42   1     Declare         Down                     bit    at(095H)     register;
43   1     Declare         TR0                      bit    at(08CH)     register;
44   1     Declare         TCON                     byte   at(088H)     register;
45   1     Declare         TMOD                     byte   at(089H)     register;
46   1     Declare         TL0                      byte   at(08AH)     register;
47   1     Declare         TH0                      byte   at(08CH)     register;
48   1     Declare         IE                       byte   at(0A8H)     register;

49   2     Display_Data:               Procedure                          public;

50   3     Wait_One_Twentieth_Second:  Procedure                               ;
51   3       TR0                  =                    Stop;
52   3       TL0                  =        Initial_Low_Byte;
53   3       TH0                  =       Initial_High_Byte;
54   3       Fifty_Milliseconds   =                   Reset;
55   3       TR0                  =                   Start;
56   4       Do While Fifty_Milliseconds     <           1;
57   4       End;
```

```
58   2    End                  Wait_One_Twentieth_Second;

59   3    Wait_One_Half_Second:      Procedure                          ;
60   3      Tic_Count                =        0;
61   4      Do While    Tic_Count    <        10
                                     and
                             (Up     =  Pressed
                                     or
                              Down   = Pressed);

62   4        Call   Wait_One_Twentieth_Second;
63   4        Tic_Count       =    Tic_Count + 1;
64   4        End;
65   2      End           Wait_One_Half_Second;

66   3    Display_Swim_Data:  Procedure                                  ;

67   3      If Lap_Num              =                        0
            Then
68   4        Do;

69   4          Call Display      (Blank,(Session_Temperature(Session_Index))/10,
                                       Session_Temperature(Session_Index) mod 10,
                                              Degree_Sign,Lap_Display,No_Decimal,
                                                               Swimmer_Position);

70   4          Call Display       ((Session_Value(Session_Index,Lap_Num))/12000,
                          (Session_Value(Session_Index,Lap_Num) mod 12000)/1200,
                            (Session_Value(Session_Index,Lap_Num) mod 1200)/200,
                              (Session_Value(Session_Index,Lap_Num) mod 200)/20,
                                         T_E_T_Display,Colon,Swimmer_Position);

71   4        End;
72   3      Else
              Do;

73   4          Call Display      (Blank,Lap_Num/100,(Lap_Num mod 100)/10,
                                  Lap_Num mod 10,Lap_Display,No_Decimal,
                                  Swimmer_Position);

74   4          Call Display
                          ((Session_Value(Session_Index,Lap_Num) mod 12000)/1200,
                             (Session_Value(Session_Index,Lap_Num) mod 1200)/200,
                               (Session_Value(Session_Index,Lap_Num) mod 200)/20,
                                 (Session_Value(Session_Index,Lap_Num) mod 20)/2,
                                  T_E_T_Display,Tenth_Position,Swimmer_Position);

75   4        End;

76   3      Call Display                   (S,Middle_Dash,(Session_Index + 1)/10,
                                                  (Session_Index + 1) mod 10,
                                                      S_Display,No_Decimal,
                                                         Swimmer_Position);

77   2    End Display_Swim_Data;

78   3    Presentation:             Procedure                            ;

79   3      If  Up = Pressed
            Then
80   4        Do;
81   4          Lap_Num          =       Lap_Num + 1;
82   4          If    Lap_Num    >       Max_Lap_Num
                Then
83   5            Do;
84   5              Lap_Num       =                0;
85   5              Session_Index = Session_Index + 1;
86   5              If       Session_Index     >      9
                    Then     Session_Index     =      0;
88   5            End;
89   4        End;
```

```
90   3          Else
                  Do;
91   4              Lap_Num           =       Lap_Num - 1;
92   4              If    Lap_Num     >       Max_Lap_Num
                    Then
93   5                Do;
94   5                  Lap_Num       =       Max_Lap_Num;
95   5                  Session_Index = Session_Index - 1;
96   5                  If       Session_Index     >     9
                        Then     Session_Index     =     9;
98   5                End;
99   4            End;

100  3          Call                      Display_Swim_Data;

101  2        End Presentation;

           /****************   Beginning of Display Data Procedure   ****************/

102  2          Set_Up_Clock:
                  Do;
103  3              TMOD    =        Timer_0;
104  3              IE      =     Timer_Mask;
105  2            End           Set_Up_Clock;

106  2          Lap_Num               =           Reset;

107  2          Wait_for_Release:
                Do While    Down      =        Pressed;
108  3            Call     Wait_One_Twentieth_Second;
109  2          End                    Wait_for_Release;

110  2          Call Wait_One_Half_Second;

111  2          Loop_Until_Reset:
                Do  While       1;

112  3            Loop_While_Up_or_Down:
                  Do While    Up = Pressed or Down = Pressed;
113  4              Call                        Presentation;
114  4              Call                 Wait_One_Half_Second;

115  4              Auto_Repeat:
                    Do While Up = Pressed or Down = Pressed;
116  5                Call                        Presentation;
117  5                Call        Wait_One_Twentieth_Second;
118  4              End                          Auto_Repeat;
119  3            End                  Loop_While_Up_or_Down;

120  3          Call                       Display_Swim_Data;

121  2          End                         Loop_Until_Reset;

122  1        End                               Display_Data;
123  1      END                          DISPLAY_DATA_MODULE;

MODULE INFORMATION:                (STATIC+OVERLAYABLE)
    CODE SIZE                      = 02C3H       707D
    CONSTANT SIZE                  = 0000H        0D
    DIRECT VARIABLE SIZE           =   03H+00H    3D+  0D
    INDIRECT VARIABLE SIZE         =   00H+00H    0D+  0D
    BIT SIZE                       =   00H+00H    0D+  0D
    BIT-ADDRESSABLE SIZE           =   00H+00H    0D+  0D
    AUXILIARY VARIABLE SIZE        = 000AH        10D
    MAXIMUM STACK SIZE             = 000EH        14D
    REGISTER-BANK(S) USED:           0
    207 LINES READ
    0 PROGRAM ERROR(S)
END OF PL/M-51 COMPILATION
```

```
        $NOLIST

 1  1   SESSION_VALUE_MODULE:  DO;

 2  1     Declare          Session (10)      Structure    (Swim_Times (401) word)
                                             external                auxiliary;


 3  2     Session_Value:  Procedure(Session_Number,Lap_Number) Word       public;

 4  2       Declare        Session_Number          byte                        ;

 5  2       Declare        Time_Data               word                        ;

 6  2       Declare        Lap_Number              word                        ;

 7  2       Time_Data      =      Session(Session_Number).Swim_Times(Lap_Number);

 8  2       Return                                                    Time_Data;

 9  1     End Session_Value;

10  1   END SESSION_VALUE_MODULE;



MODULE INFORMATION:                (STATIC+OVERLAYABLE)
    CODE SIZE                      = 002AH        42D
    CONSTANT SIZE                  = 0000H         0D
    DIRECT VARIABLE SIZE           =    00H+05H    0D+  5D
    INDIRECT VARIABLE SIZE         =    00H+00H    0D+  0D
    BIT SIZE                       =    00H+00H    0D+  0D
    BIT-ADDRESSABLE SIZE           =    00H+00H    0D+  0D
    AUXILIARY VARIABLE SIZE        = 0000H         0D
    MAXIMUM STACK SIZE             = 0002H         2D
    REGISTER-BANK(S) USED:           0
    28 LINES READ
    0 PROGRAM ERROR(S)
END OF PL/M-51 COMPILATION
          $NOLIST

 1  1     SERIAL_OUT_MODULE:  DO;

 2  2       Display:  Procedure    (Thousands,Hundreds,Tens,units,Display_Position,
                                         DP_Colon_Position,Format) external;
 3  2         Declare          Thousands              byte                  ;
 4  2         Declare          Hundreds               byte                  ;
 5  2         Declare          Tens                   byte                  ;
 6  2         Declare          units                  byte                  ;
 7  2         Declare          Display_Position       byte                  ;
 8  2         Declare          DP_Colon_Position      byte                  ;
 9  2         Declare          Format                 bit                   ;
10  1       End Display;

11  2       Swim_Timer_Mode: Procedure                        byte       external;
12  1       End Swim_Timer_Mode;

13  2       Session_Value:  Procedure(Session_Number,Lap_Num)    Word      external;
14  2         Declare        Session_Number           byte                        ;
15  2         Declare        Lap_Num                  word                        ;
16  1       End Session_Value;

17  1       Declare          Session_Index               byte           external;

18  1       Declare          Session_Temperature(10)     byte           external
                                                                       auxiliary;
```

```
19  1   Declare   Mode_Save                 byte                  ;
20  1   Declare   Control_Save              byte                  ;
21  1   Declare   Interrupt_Save            byte                  ;

22  1   Declare   TI                        bit  at(099H) register;
23  1   Declare   RI                        bit  at(098H) register;

24  1   Declare   TH1                       byte at(08DH) register;
25  1   Declare   Serial_control            byte at(098H) register;
26  1   Declare   Timer_mode                byte at(089H) register;
27  1   Declare   Timer_control             byte at(088H) register;
28  1   Declare   Interrupt_mask            byte at(0A8H) register;
29  1   Declare   SBUF                      byte at(099H) register;

30  1   Declare   S                         literally          '5';
31  1   Declare   S_Display                 literally          '0';
32  1   Declare   Lap_Display               literally          '1';
33  1   Declare   T_E_T_Display             literally          '2';
34  1   Declare   No_Decimal                literally          '0';
35  1   Declare   Blank                     literally         '10';
36  1   Declare   Middle_Dash               literally         '12';
37  1   Declare   Send_Position             literally          '1';
38  1   Declare   Timer_mode_byte           literally       '020H';
39  1   Declare   Timer_control_byte        literally       '040H';
40  1   Declare   Mask                      literally       '000H';
41  1   Declare   Serial_control_byte       literally       '050H';
42  1   Declare   Baud_Byte                 literally        '245';
43  1   Declare   Serial_Mode               literally          '2';
44  1   Declare   Reset                     literally          '0';


45  2   Serial_Out:     Procedure                             public;

46  2     Declare       Lap_Number              word                ;

47  3     Serial_Set_Up: Procedure                                  ;

48  3     Mode_Save                 =                     Timer_mode;
49  3     Control_Save              =                  Timer_control;
50  3     Interrupt_Save            =                 Interrupt_mask;

51  3     Timer_mode                =                Timer_mode_byte;
52  3     Interrupt_mask            =                           Mask;
53  3     TH1                       =                      Baud_Byte;

54  3     Serial_control            =            Serial_control_byte;
55  3     Timer_control             =             Timer_control_byte;
56  2   End Serial_Set_Up;


57  3     Send:         Procedure (Out_Byte)                        ;

58  3       Declare           Out_Byte          byte                ;

59  3       TI                  =                             Reset;
60  3       Sbuf                =                          Out_Byte;
61  4       Do  While TI        =                             Reset;
62  4       End;
63  2     End Send;

64  2     Call Serial_Set_Up;

65  2     RI                    =       Reset;

      /*  Wait_On_PC:
          Do  While        RI   =       Reset;
          End                        Wait_On_PC;
      */
66  2     Call                       Time(250);
```

```
67   2        Call            Display      (Blank,Blank,Blank,Blank,
                                             Lap_Display,No_Decimal,
                                                 Send_Position);

68   2        Call            Display      (Blank,Blank,Blank,Blank,
                                           T_E_T_Display,No_Decimal,
                                                 Send_Position);


69   2        Loop_Until_Done:
              Do              Session_Index        =  0        to       9;
70   3          Call          Display        (S,Middle_Dash,(Session_Index + 1)/10,
                                              (Session_Index + 1) MOD 10,S_Display,
                                                    No_Decimal,Send_Position);

71   3          Call          Send          (LOW(Session_Value(Session_Index,0)));
72   3          Call          Send         (HIGH(Session_Value(Session_Index,0)));
73   3          Call          Send          (Session_Temperature(Session_Index));
74   3          Call          Send          (LOW(Session_Value(Session_Index,0)));
75   3          Call          Send         (HIGH(Session_Value(Session_Index,C)));

76   4          Do            Lap_Number                 = 1        to      400;
77   4            Call        Send (LOW(Session_Value(Session_Index,Lap_Number)));
78   4            Call        Send(HIGH(Session_Value(Session_Index,Lap_Number)));
79   4          End;

80   2        End Loop_Until_Done;

81   2        TH1                    =                                  Reset;
82   2        Timer_mode             =                              Mode_Save;
83   2        Timer_control          =                           Control_Save;
84   2        Interrupt_mask         =                         Interrupt_Save;

85   2        Session_Index          =                                  Reset;

86   2        Wait_On_Mode_Change:
              Do While Swim_Timer_Mode = Serial_Mode;
87   2        End Wait_On_Mode_Change;

88   1      End Serial_Out;

89   1    END SERIAL_OUT_MODULE;
```

```
MODULE INFORMATION:                (STATIC+OVERLAYABLE)
    CODE SIZE                      = 0179H       377D
    CONSTANT SIZE                  = 0000H        0D
    DIRECT VARIABLE SIZE           =   03H+03H    3D+  3D
    INDIRECT VARIABLE SIZE         =   00H+00H    0D+  0D
    BIT SIZE                       =   00H+00H    0D+  0D
    BIT-ADDRESSABLE SIZE           =   00H+00H    0D+  0D
    AUXILIARY VARIABLE SIZE        = 0000H        0D
    MAXIMUM STACK SIZE             = 0006H        6D
    REGISTER-BANK(S) USED:           0
    146 LINES READ
    0 PROGRAM ERROR(S)
END OF PL/M-51 COMPILATION
```

```
         $NOLIST

 1  1    CLEAR_SESSIONS_MODULE:  DO;

 2  2      Display:  Procedure     (Thousands,Hundreds,Tens,units,Display_Position,
                                    DP_Colon_Position,Format) external;
 3  2        Declare         Thousands          byte              ;
 4  2        Declare         Hundreds           byte              ;
 5  2        Declare         Tens               byte              ;
 6  2        Declare         units              byte              ;
 7  2        Declare         Display_Position   byte              ;
 8  2        Declare         DP_Colon_Position  byte              ;
 9  2        Declare         Format             bit               ;
10  1      End Display;

11  2      Swim_Timer_Mode:      Procedure           byte          external;
12  1      End Swim_Timer_Mode;

13  1      Declare          Session (10)    Structure   (Swim_Times (401)   word)
                                                         external        auxiliary;

14  1      Declare          Session_Temperature(10)     byte            external
                                                                         auxiliary;

15  1      Declare          Session_Index               byte            external;

16  1      Declare          Swimmer_position            bit             external;

17  1      Declare          Clear                          literally        '0';
18  1      Declare          Clear_Mode                     literally        '3';
19  1      Declare          Max_Index                      literally        '9';
20  1      Declare          No_Decimal                     literally        '0';
21  1      Declare          S_Display                      literally        '0';
22  1      Declare          Lap_Display                    literally        '1';
23  1      Declare          T_E_T_Display                  literally        '2';
24  1      Declare          S                              literally        '5';
25  1      Declare          Blank                          literally       '10';
26  1      Declare          Middle_Dash                    literally       '12';

27  1      Declare          Lap_num                        word              ;

28  2      Clear_Sessions:  Procedure                                    public;
29  2        Call           Display  (Clear,Clear,Clear,Clear,T_E_T_Display,
                                      No_Decimal,Swimmer_Position);

30  2        Clear_All:
             Do             Session_Index       =    0        to     Max_Index;
31  3          Call        Display          (S,Middle_Dash,(Session_Index + 1)/10,
                                             (Session_Index + 1) mod 10,S_Display,
                                                  No_Decimal,Swimmer_Position);

32  3          Clear_Laps:
               Do          Lap_num              =    0        to          400;

33  4            Session(Session_Index).Swim_Times(Lap_Num)        =        Clear;

34  4            Call       Display         (Blank,Lap_num/100,(Lap_num mod 100)/10,
                                             Lap_num mod 10,Lap_Display,No_Decimal,
                                                             Swimmer_position);

35  3          End                                                    Clear_Laps;

36  2        End                                                       Clear_All;

              /********************      Clear Temps       **********************/

37  3        Do Session_Index                      =    0    to         9;
38  3          Session_Temperature(Session_Index)  =              Clear;
39  3        End;
```

```
40   2        Session_Index               =                      Clear;


41   2        Wait_On_Mode_Change:
              Do While   Swim_Timer_Mode  =                  Clear_Mode;
42   2        End                                   Wait_On_Mode_Change;

43   1      End Clear_Sessions;

44   1    END CLEAR_SESSIONS_MODULE;



MODULE INFORMATION:                  (STATIC+OVERLAYABLE)
    CODE SIZE                        = 0112H       274D
    CONSTANT SIZE                    = 0000H       0D
    DIRECT VARIABLE SIZE             =    02H+00H    2D+  0D
    INDIRECT VARIABLE SIZE           =    00H+00H    0D+  0D
    BIT SIZE                         =    00H+00H    0D+  0D
    BIT-ADDRESSABLE SIZE             =    00H+00H    0D+  0D
    AUXILIARY VARIABLE SIZE          = 0000H       0D
    MAXIMUM STACK SIZE               = 0002H       2D
    REGISTER-BANK(S) USED:             0
    85 LINES READ
    0 PROGRAM ERROR(S)
END OF PL/M-51 COMPILATION
 1   1     DISPLAY_TEMPERATURE_MODULE:  DO;

 2   2       Display:  Procedure     (Thousands,Hundreds,Tens,units,Display_Position,
                                           DP_Colon_Position,Format) external;
 3   2         Declare          Thousands             byte                     ;
 4   2         Declare          Hundreds              byte                     ;
 5   2         Declare          Tens                  byte                     ;
 6   2         Declare          units                 byte                     ;
 7   2         Declare          Display_Position      byte                     ;
 8   2         Declare          DP_Colon_Position     byte                     ;
 9   2         Declare          Format                bit                      ;
10   1       End Display;

11   2       Water_Temperature:          Procedure        byte              external;
12   1       End Water_Temperature;

13   1       Declare           Swimmer_Position           bit               external;

14   1       Declare           No_Decimal                      literally        '0';
15   1       Declare           S_Display                       literally        '0';
16   1       Declare           Lap_Display                     literally        '1';
17   1       Declare           T_E_T_Display                   literally        '2';
18   1       Declare           Blank                           literally       '10';
19   1       Declare           Degree_Sign                     literally       '17';
20   2       Display_Temperature:    Procedure                                public;

21   2         Call                    Display                (Blank,Blank,Blank,Blank,
                                                                 S_Display,No_Decimal,
                                                                    Swimmer_Position);

22   2         Call                    Display (Blank,(Water_Temperature MOD 100)/10,
                                                             Water_Temperature MOD 10,
                                                              Degree_Sign,Lap_Display,
                                                       No_Decimal,Swimmer_Position);

23   2         Call                    Display                (Blank,Blank,Blank,Blank,
                                                               T_E_T_Display,No_Decimal,
                                                                    Swimmer_Position);

24   1        End Display_Temperature;

25   1      END DISPLAY_TEMPERATURE_MODULE;
```

```
MODULE INFORMATION:              (STATIC+OVERLAYABLE)
    CODE SIZE                    = 0074H      116D
    CONSTANT SIZE                = 0000H        0D
    DIRECT VARIABLE SIZE         =   00H+00H    0D+  0D
    INDIRECT VARIABLE SIZE       =   00H+00H    0D+  0D
    BIT SIZE                     =   00H+00H    0D+  0D
    BIT-ADDRESSABLE SIZE         =   00H+00H    0D+  0D
    AUXILIARY VARIABLE SIZE      = 0000H        0D
    MAXIMUM STACK SIZE           = 0004H        4D
    REGISTER-BANK(S) USED:         0
    47 LINES READ
    0 PROGRAM ERROR(S)
END OF PL/M-51 COMPILATION

 1  1      WATER_TEMPERATURE_MODULE:  DO;

 2  2        Swim_Timer_Mode:            Procedure        byte        external;
 3  1        End Swim_Timer_Mode;

 4  1        Declare          Raw_Temp              word             public;

 5  1        Declare          Temp_Flag             bit              public;

 6  2        Water_Temperature: Procedure           byte             public;
 7  2          Declare        Timer_mode            byte  at(089H)  register;
 8  2          Declare        Timer_control         byte  at(088H)  register;
 9  2          Declare        Interrupt_mask        byte  at(0A8H)  register;
10  2          Declare        TR0                   bit   at(08CH)  register;

11  2          Declare        Mask                        literally   '082H';
12  2          Declare        Timer_control_byte          literally   '010H';
13  2          Declare        Timer_mode_byte             literally   '051H';
14  2          Declare        Converting                  literally   '001H';
15  2          Declare        Start                       literally   '001H';

16  2          Declare        Mode_Save             byte                    ;
17  2          Declare        Control_Save          byte                    ;
18  2          Declare        Interrupt_Save        byte                    ;
19  2          Declare        Mode_Check            byte                    ;

20  2          Declare        Temperature           word                    ;

21  2          Mode_Save              =                           Timer_mode;
22  2          Control_Save           =                        Timer_control;
23  2          Interrupt_Save         =                       Interrupt_mask;

24  2          Timer_mode             =                      Timer_mode_byte;
25  2          Timer_control          =                   Timer_control_byte;
26  2          Interrupt_mask         =                                 Mask;
27  2          TR0                    =                                Start;
28  2          Temp_Flag              =                           Converting;

29  3          Do   While   Temp_Flag  =                          Converting;

             /******   Set up Swim Timer mode for exit of Temp mode   ******/
30  3            Mode_Check           =                      Swim_Timer_Mode;

31  3          End;
32  2          Temperature            =          Raw_Temp/210       -     27;

33  2          Timer_mode             =                            Mode_Save;
34  2          Timer_control          =                         Control_Save;
35  2          Interrupt_mask         =                       Interrupt_Save;

36  2          Return                                     LOW(Temperature);

37  1        End Water_Temperature;

38  1      END WATER_TEMPERATURE_MODULE;
```

```
MODULE INFORMATION:                     (STATIC+OVERLAYABLE)
    CODE SIZE                           = 0049H      73D
    CONSTANT SIZE                       = 0000H       0D
    DIRECT VARIABLE SIZE                =   02H+06H   2D+  6D
    INDIRECT VARIABLE SIZE              =   00H+00H   0D+  0D
    BIT SIZE                            =   01H+00H   1D+  0D
    BIT-ADDRESSABLE SIZE                =   00H+00H   0D+  0D
    AUXILIARY VARIABLE SIZE             = 0000H       0D
    MAXIMUM STACK SIZE                  = 0002H       2D
    REGISTER-BANK(S) USED:                 0
    62 LINES READ
    0 PROGRAM ERROR(S)
END OF PL/M-51 COMPILATION
 1   1      DISPLAY_MODULE:  Do;

 2   2      Display:    Procedure      (Thousands,Hundreds,Tens,units,Display_Position,
                                                  DP_Colon_Position,Format) public;

 3   2      Declare           Thousands                byte                              ;
 4   2      Declare           Hundreds                 byte                              ;
 5   2      Declare           Tens                     byte                              ;
 6   2      Declare           units                    byte                              ;
 7   2      Declare           Display_Position         byte                              ;
 8   2      Declare           DP_Colon_Position        byte                              ;
 9   2      Declare           Byte_Count               byte                              ;

10   2      Declare           Format                   bit                               ;

11   2      Declare           Byte_Reset                        literally          '5';

12   2      Declare           DP_Offset                         literally          '4';
13   2      Declare           Colon                             literally          '4';
14   2      Declare           No_Decimal                        literally          '0';
15   2      Declare           Reset_Code                        literally          '0';
16   2      Declare           Normal                            literally          '0';
17   2      Declare           Reset                             literally          '0';
18   2      Declare           High                              literally          '1';
19   2      Declare           Max_Limit                         literally          '2';
20   2      Declare           Set_Code                          literally        '80H';

21   2      Declare           Display_bit              bit      at(94h)        register;
22   2      Declare           Clock                    bit      at(92h)        register;
23   2      Declare           Total_Elapsed_Time_Load  bit      at(93h)        register;
24   2      Declare           Lap_Load                 bit      at(91h)        register;
25   2      Declare           Split_Load               bit      at(90h)        register;

26   3        Bit_out:      Procedure(number)                                        ;
27   3                      Declare  (number,bit_count,Special_Code)              byte;

28   3                      Declare  Normal_segment_Format(21)                    byte

              /*                     0    1    2    3    4    5    6    7    8    9        */
                            Constant (3FH,06H,5BH,4FH,66H,6DH,7DH,07H,7FH,67H,

              /*                    Blank  Low Dash  Mid Dash  High Dash                  */
                                     00H,    08H,      40H,      01H,

              /*                       F    U    L   Degree Sign   C      E       P     */
                                     71H,3EH,38H,       63H,       39H,   79H,   73H  );

29   3                      Declare  Reverse_segment_Format(21)                   byte

              /*                     0    1    2    3    4    5    6    7    8    9        */
                            Constant (3FH,30H,5BH,79H,74H,6DH,6FH,38H,7FH,7CH,

              /*                    Blank  Low Dash  Mid Dash  High Dash                  */
                                     00H,    01H,      40H,      08H,
```

```
               /*                    F   U   L    Degree Sign    C     E     P  */
                                     4EH,37H,07H,      5CH,     0FH,  4FH,  5EH  );

30  3                   Byte_Count          =     Byte_Count  -   1;

31  3                   If   Byte_Count     =     DP_Colon_Position
                        Then
32  4                     Do;
33  4                       Special_Code  =               Set_Code;
34  4                     End;
35  3                   Else
                          Do;
36  4                       Special_Code  =             Reset_Code;
37  4                     End;

38  3                   Data_Out_Loop:
                        Do bit_count = 1 to 8;
39  4                     Clock = High;

40  4                     If Format = Normal

                          Then
41  5                       Do;
42  5                         Display_bit  =
                                   Boolean(Rol((Normal_segment_Format(number)
                                                              OR
                                                  Special_Code) ,bit_count));
43  5                       End;
44  4                     Else
                            Do;
45  5                         Display_bit  =
                                   Boolean(Rol((Reverse_segment_Format(number)
                                                                OR
                                                     Special_Code),bit_count));
46  5                       End;

47  4                     Clock = Reset;
48  3                   End                                       Data_Out_Loop;

49  2       End bit_out;
50  2           Byte_Count              =   Byte_Reset;

51  2           If Display_Position     >    Max_Limit
                Then
52  3             Do;
53  3               Display_Position    =    Max_Limit;
54  3             End;


55  2       Display_Format:
            Do case Expand(Format);

56  3         Normal_display:
              Do;
57  4           Call                  bit_out(Thousands);
58  4           Call                  bit_out (Hundreds);
59  4           Call                  bit_out     (Tens);
60  4           Call                  bit_out    (Units);

61  4           Normal_Display_Position:
                Do Case Display_Position;

62  5             Total_Elapsed_Time_Display:
                  Do;
63  6               Total_Elapsed_Time_Load  =  High;
64  6               Total_Elapsed_Time_Load  = Reset;
65  5             End     Total_Elapsed_Time_Display;

66  5             Lap_Display:
                  Do;
```

```
67   6              Lap_Load                 = High;
68   6              Lap_Load                 = Reset;
69   5            End                Lap_Display;

70   5            Split_Display:
                  Do;
71   6              Split_Load               = High;
72   6              Split_Load               = Reset;
73   5            End              Split_Display;

74   4          End          Normal_Display_Position;

75   3        End                      Normal_Display;

76   3        Invert_display:
              Do;
77   4          If   DP_Colon_Position        <>          Colon
                                             and
                     DP_Colon_Position        <>     No_Decimal
                Then
78   5            Do;
79   5              DP_Colon_Position    =   DP_Offset - DP_Colon_Position;
80   5            End;

81   4          Call                 bit_out    (Units);
82   4          Call                 bit_out     (Tens);
83   4          Call                 bit_out (Hundreds);
84   4          Call                 bit_out(Thousands);

85   4          Invert_Display_Position:
                Do Case Display_Position;

86   5            Split_Display:
                  Do;
87   6              Split_Load               = High;
88   6              Split_Load               = Reset;
89   5            End              Split_Display;

90   5            Lap_Display:
                  Do;
91   6              Lap_Load                 = High;
92   6              Lap_Load                 = Reset;
93   5            End                Lap_Display;

94   5            Total_Elapsed_Time_Display:
                  Do;
95   6              Total_Elapsed_Time_Load  = High;
96   6              Total_Elapsed_Time_Load  = Reset;
97   5            End     Total_Elapsed_Time_Display;

98   4          End          Invert_Display_Position;

99   3        End Invert_display;

100  2      End Display_Format;

101  1    End Display;

102  1    End DISPLAY_MODULE;

MODULE INFORMATION:            (STATIC+OVERLAYABLE)
   CODE SIZE                   = 010AH       266D
   CONSTANT SIZE               = 002AH        42D
   DIRECT VARIABLE SIZE        =   00H+0AH     0D+ 10D
   INDIRECT VARIABLE SIZE      =   00H+00H     0D+  0D
   BIT SIZE                    =   00H+01H     0D+  1D
   BIT-ADDRESSABLE SIZE        =   00H+00H     0D+  0D
   AUXILIARY VARIABLE SIZE     = 0000H         0D
   MAXIMUM STACK SIZE          = 0004H         4D
```

```
REGISTER-BANK(S) USED:          0
192 LINES READ
0 PROGRAM ERROR(S)
END OF PL/M-51 COMPILATION

 1  1   SWIM_CLOCK_MODULE:  Do;

 2  1     Declare   Fifty_milliseconds                word      public;
 3  1     Declare   Fifty_milliseconds_overflow       byte      public;

 4  1     Declare   Raw_Temp                          word      external;

 5  1     Declare   Temp_Flag                         bit       external;

 6  1     Declare   TH1                 byte   at(8DH)    register;
 7  1     Declare   TL1                 byte   at(8BH)    register;
 8  1     Declare   Timer_0_high_byte   byte   at(8CH)    register;
 9  1     Declare   Timer_0_low_byte    byte   at(8AH)    register;

10  1     Declare   TR1                 bit    at(8EH)    register;

11  1     Declare   Initial_high_byte                 literally   '5DH';
12  1     Declare   Initial_low_byte                  literally   '3DH';
13  1     Declare   One_Second                        literally   '20';
14  1     Declare   One_more                          literally   '1';
15  1     Declare   Convert                           literally   '1';
16  1     Declare   Stop                              literally   '0';
17  1     Declare   Start                             literally   '1';
18  1     Declare   Fifty_milliseconds_roll_over      literally   '0';
19  1     Declare   Reset                             literally   '0';

20  2     Swim_clock:   Procedure                     interrupt 1   using 2;

21  2       Timer_0_high_byte      =  Initial_high_byte;
22  2       Timer_0_low_byte       =  Initial_low_byte;

23  2       If Temp_Flag                  =                    Convert
            Then
24  3         Do;
25  3           If   TR1                  =                    Stop
                Then
26  4             Do;
27  4               TH1                   =                    Reset;
28  4               TL1                   =                    Reset;
29  4               Fifty_milliseconds    =                    Reset;
30  4               TR1                   =                    Start;
31  4             End;
32  3           If Fifty_milliseconds     >=               One_Second
                Then
33  4             Do;
34  4               TR1                   =                    Stop;
35  4               Raw_Temp              =    SHL(DOUBLE(TH1),8) OR TL1;
36  4               Temp_Flag             =    NOT             Temp_Flag;
37  4             End;
38  3         End;

39  2       Fifty_milliseconds            =  Fifty_milliseconds + One_more;

40  2       If Fifty_milliseconds         =  Fifty_milliseconds_roll_over
            Then
41  3         Do;
42  3           Fifty_milliseconds_overflow =  Fifty_milliseconds_overflow
                                                      +
                                                           One_more;

43  3         End;

44  1     End Swim_clock;

45  1   End SWIM_CLOCK_MODULE;
```

```
WARNINGS:
    1 IS THE HIGHEST USED INTERRUPT


MODULE INFORMATION:                    (STATIC+OVERLAYABLE)
    CODE SIZE                          = 004EH        78D
    CONSTANT SIZE                      = 0000H         0D
    DIRECT VARIABLE SIZE               =   03H+00H     3D+  0D
    INDIRECT VARIABLE SIZE             =   00H+00H     0D+  0D
    BIT SIZE                           =   00H+00H     0D+  0D
    BIT-ADDRESSABLE SIZE               =   00H+00H     0D+  0D
    AUXILIARY VARIABLE SIZE            = 0000H         0D
    MAXIMUM STACK SIZE                 = 000DH        13D
    REGISTER-BANK(S) USED:               2
    72 LINES READ
    0 PROGRAM ERROR(S)
END OF PL/M-51 COMPILATION
```

We claim:

1. A sport counting device for monitoring an object moving in repeated laps along a predetermined course, the object continuously transmitting a pulsing signal from a single transmission source comprising:

first and second receivers capable of detecting the pulsing signal, the receivers being spaced from each other, comparing means for determining the time differential between the times the pulsing signal reaches the first and second receivers, counter means comprising a visual display, counter update means operatively connected to the comparing means such that the counter is updated when the comparing means determines completion of a lap based upon the time differential between the times the pulsing signal reaches the first and second receivers.

2. The sport counting device of claim 1 wherein the counter update means is updated when the time differentials between receipt of the pulses by the two receivers change from increasing to decreasing.

3. The sport counting device of claim 1 wherein the counter update means is updated based on there being substantially no time difference between the times the pulsing signal reaches the first and second receivers.

4. The sport counting device of claim 1 wherein the counter update means is updated based on a change in which receiver receives the signal first.

5. The sport counting device of claim 1 wherein the visual display means displays a lap counter comprising the number of times the counter update means is updated.

6. The sport counting device of claim 1 wherein the visual display means displays the elapsed time between the beginning of a lap and completion of the lap.

7. The sport counting device of claim 1 wherein the sport timer is entirely submersible in water and wherein the visual display is upwardly projecting.

8. The sport counting device of claim 1 further comprising means for displaying the visual display in either noninverted or inverted format, the displaying means being operatively connected to the counter update means.

9. A counting device for an object repeatedly moving in opposite directions past a fixed point comprising:

sensor means for determining when the object passes by the sensor means, timing means, visual display means connected to the timing means for displaying a numerical statistic regarding the moving object, the visual display means comprising means for displaying the numerical statistic in either non-inverted or inverted format, the display means being operatively connected to the sensor means.

10. The counting device of claim 9 wherein the visual display comprises a seven segment visual display.

11. The counting device of claim 9 wherein the displaying means inverts the visual display based upon the object passing by the sensor.

12. The counting device of claim 11 wherein the inversion occurs a predetermined time after an object passes by the sensor.

13. The counting device of claim 9 wherein the numerical statistic comprises a count of the number of laps completed.

14. The counting device of claim 9 wherein the numerical statistic comprises the time for completion of a lap.

15. The counting device of claim 9 wherein the counting device is submersible in water and wherein the visual display is upwardly projecting.

16. The counting device time of claim 9 wherein the sensor means comprises means for receiving a signal transmitted by the moving object.

17. The counting device of claim 16 wherein the receiving means comprises first and second receivers capable of detecting the transmitted signal, the receivers being spaced from each other, and wherein the device further comprises:

comparing means for determining the time differential between the times the signal reaches the first and second receivers.

18. The counting device of claim 17 wherein the displaying means inverts the visual display based on there being substantially no time difference between the times the pulsing signal reaches the first and second receiver.

19. The counting device of claim 17 wherein the displaying mean inverts the visual display each time the time differentials between receipt of the signal by the two receivers changes from increasing to decreasing.

20. The counting device of claim 16 wherein the means for determining when the object passes by the sensor comprises doppler shift detecting means.

21. A swimming counter for a swimmer swimming laps comprising:

a waterproof, submersible housing comprising at least one upwardly projecting visual display observable by a downwardly facing swimmer, an internal power source and non-contact detecting means for detecting means for detecting the position of a swimmer relative to the housing, counter means operatively connected to the visual display and detecting means such that the counter means is updated when the non-contact detecting means detects that the swimmer has completed a lap.

22. The swimming counter of claim 21 wherein the non-contact detecting means comprises:

first and second receivers capable of detecting a signal, the receivers being spaced from each other, comparing means for determining the time differential between the times the signal reaches the first and second receivers, counter update means operatively connected to the comrising means such that the counter is updated when the comparing means determines completion of a lap based upon the time differential between the times the signal reaches the first and second receivers.

23. The swimming counter of claim 22 wherein the counter update means is updated based upon the time differentials between receipt of the pulses by the two receivers change from increasing to decreasing.

24. The swimming counter of claim 21 further comprising means for displaying the visual display in either non-inverted or inverted format, the displaying means being operatively connected to the counter update means.

25. The swimming counter of claim 21 wherein the visual display displays a count of the number of laps completed.

26. The swimming counter of claim 21 wherein the visual display displays the time for completion of a lap.

27. A swimming counter comprising:

a waterproof, submersible housing comprising at least one upwardly projecting visual display and an internal power source, detecting means for detecting completion of a lap, counter means for counting operatively connected to the detecting means, switch means for starting the counter means, the switch means being actuable by a magnet passed in close proximity to the housing, data storage means for storing counts of statistics for a plurality of laps, review switch means for displaying the stored statistics on the visual display, the review switch means being actuable by a magnet passed in close proximity to the housing.

28. The swimming counter of claim 27 further comprising:

an interface port operatively connected to the data storage means such that counts stored in the data storage means may be copied to an external device through the interface port.

29. A swimming counter for a swimmer swimming laps comprising:

a submersible, waterproof housing comprising in combination at least one digital visual display, lap completion detection means, counter means operatively connected to the visual display and lap completion detection means such that the counter means is updated when the lap completion detection means indicates that the swimmer has completed a lap, data storage means operatively connected to the counter means for electronically storing counts generated by the counter means, a single serial data interface port operatively connected to the data storage means such that counts stored in the data storage means may be copied to an external device through the interface port.

30. The swimming counter of claim 29 further comprising switch means for actuating copying of the counts through the interface port.

31. The swimming counter of claim 30 wherein the switch means is actuable by a magnet passed in proximity to the switch.

32. The swimming counter of claim 29 further comprising water temperature sensing means attached to the housing, and wherein:

the water temperature may be stored in the data storage means and copied through the interface port.

33. A method for timing a swimmer swimming laps between a starting end and an opposite end, comprising:

providing the swimmer with a transmitter capable of transmitting a signal, placing first and second receivers capable of receiving the signal between the starting end and the opposite end, the first receiver being closer to the starting end than the second receiver, providing a time counter, providing means for storing a first reference count, starting the time counter, freezing the time counter reading based upon the signal changing from being received first by the first receiver and then by the second received by an increasing time differential, to being so received at a decreasing time differential.

34. The method of claim 33 further comprising:

providing means for storing first, second, third and fourth reference counts, storing a first reference count when the swimmer begins swimming a lap from the starting end toward the opposite end, storing a second reference count when the swimmer from the opposite end toward the starting end and the transmitted signal is received by the two receivers substantially simultaneously, storing a third reference count when the signal changes from being received first by the first receiver and then by the second receiver by an increasing time differential, to being so received with a decreasing time differential, storing a fourth reference count the next time the swimmer is swimming from the starting end toward the opposite end and the transmitted signal is received by both receivers substantially simultaneously, computing the difference between the second and fourth reference counts, updating the frozen time counter reading to be equal to the second reference count plus one-half the difference between the seonc and fourth reference counts if the third reference count is not within a predetermined percentage of the average of the second and fourth reference counts.

35. The method of claim 34 wherein the predetermined percentage is twenty five percent of the difference between the second and fourth reference counts.

36. The method of claim 33 wherein the time counter begins with a count of from 0.4 to 1.4 seconds.

37. The method of claim 33 further comprising, after freezing the time counter reading, replacing the reading with a total elapsed time reading based upon the next time the swimmer is swimming from the starting end toward the opposite end and the transmitted signal is received by both receivers substantially simultaneously.

* * * * *